(12) United States Patent
Sexton et al.

(10) Patent No.: US 9,222,512 B2
(45) Date of Patent: Dec. 29, 2015

(54) BEARING ASSEMBLIES, APPARATUSES, AND MOTOR ASSEMBLIES USING THE SAME

(75) Inventors: Timothy N. Sexton, Genola, UT (US); Craig H. Cooley, Saratoga Springs, UT (US); Cody W. Knuteson, Salem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 23 days.

(21) Appl. No.: 13/550,835

(22) Filed: Jul. 17, 2012

(65) Prior Publication Data
US 2014/0023301 A1    Jan. 23, 2014

(51) Int. Cl.
| | |
|---|---|
| *F16C 33/10* | (2006.01) |
| *F16C 17/00* | (2006.01) |
| *F16C 17/02* | (2006.01) |
| *F16C 17/03* | (2006.01) |
| *F16C 33/04* | (2006.01) |
| *F16C 33/26* | (2006.01) |
| *E21B 4/00* | (2006.01) |

(52) U.S. Cl.
CPC .............. *F16C 33/108* (2013.01); *F16C 17/028* (2013.01); *F16C 17/03* (2013.01); *F16C 33/043* (2013.01); *F16C 33/1065* (2013.01); *F16C 33/26* (2013.01); *E21B 4/003* (2013.01); *F16C 2206/04* (2013.01); *Y10T 29/49636* (2015.01)

(58) Field of Classification Search
CPC ......... E21B 10/22; E21B 10/24; E21B 4/003; F16C 17/02; F16C 1/028; F16C 17/03; F16C 2206/04; F16C 33/043; F16C 33/106; F16C 33/1065; F16C 33/108; F16C 33/1085; F16C 33/26; F16C 33/28; Y10T 29/49636
USPC ............................ 384/95, 282–284, 303–305
See application file for complete search history.

(56) References Cited

U.S. PATENT DOCUMENTS

| | | | | | |
|---|---|---|---|---|---|
| 4,410,054 | A | * | 10/1983 | Nagel et al. .................... | 175/107 |
| 4,756,631 | A | * | 7/1988 | Jones ............................... | 384/95 |
| 4,789,251 | A | * | 12/1988 | McPherson et al. ........... | 384/317 |

(Continued)

OTHER PUBLICATIONS

International Search Report and Written Opinion from International Application No. PCT/US2013/046287 mailed Sep. 19, 2013.

(Continued)

*Primary Examiner* — Alan B Waits
(74) *Attorney, Agent, or Firm* — Dorsey & Whitney LLP

(57) ABSTRACT

Various embodiments of the invention relate to bearing assemblies, apparatuses and motor assemblies that include geometric features configured to impart a selected amount of heat transfer and/or hydrodynamic film formation. In an embodiment, a bearing assembly may include a plurality of superhard bearing pads distributed circumferentially about an axis. At least some of the plurality of superhard bearing pads may include a plurality of sub-superhard bearing elements defining a bearing surface. At least some of the plurality of sub-superhard bearing elements may be spaced from one another by one or more voids to impart a selected amount of heat transfer and hydrodynamic film formation thereon during operation. The bearing assembly may also include a support ring that carries the plurality of superhard bearing pads. In addition, at least a portion of the sub-superhard bearing elements may extend beyond the support ring.

19 Claims, 14 Drawing Sheets

(56) References Cited

U.S. PATENT DOCUMENTS

| | | | |
|---|---|---|---|
| 6,190,050 B1 | 2/2001 | Campbell | |
| 7,255,480 B2 * | 8/2007 | John et al. | 384/303 |
| 7,866,418 B2 | 1/2011 | Bertagnolli et al. | |
| 7,998,573 B2 | 8/2011 | Qian et al. | |
| 8,034,136 B2 | 10/2011 | Sani | |
| 2004/0190804 A1 | 9/2004 | John et al. | |
| 2009/0097788 A1 | 4/2009 | Cooley et al. | |
| 2011/0174547 A1 | 7/2011 | Sexton et al. | |

OTHER PUBLICATIONS

U.S. Appl. No. 11/545,929, filed Oct. 10, 2006, Bertagnolli et al.
U.S. Appl. No. 11/983,619, filed Nov. 9, 2007, Sani.
U.S. Appl. No. 13/166,007, filed Jun. 22, 2011, Chapman et al.
U.S. Appl. No. 13/089,725, filed Apr. 19, 2011, Cooley et al.
Bejan "Shape and Structure" Engineering to Nature; Cambridge University Press (2000) pp. 29-44.

* cited by examiner

BEARING ASSEMBLIES, APPARATUSES, AND MOTOR ASSEMBLIES USING THE SAME

STATEMENT REGARDING GOVERNMENT RESEARCH AND DEVELOPMENT

This invention was made with Government support under a government contract no. DE-EE0003633 awarded by the U.S. Department of Energy to US Synthetic Corporation. The Government has certain rights in this invention.

BACKGROUND

Subterranean drilling systems that employ downhole drilling motors are commonly used for drilling boreholes in the earth for oil and gas exploration and production. Such subterranean drilling systems typically include a downhole drilling motor that is operably connected to an output shaft. A pair of thrust-bearing apparatuses also can be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The on-bottom and off-bottom thrust carried by the thrust-bearing apparatuses can be extremely large.

The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to cool and/lubricate the bearing elements of the thrust-bearing apparatuses. The operational lifetime of the thrust-bearing apparatuses often can determine the useful life of the subterranean drilling system.

Accordingly, manufacturers and users of bearing apparatus continue to seek improved bearing apparatuses.

SUMMARY

Various embodiments of the invention relate to bearing assemblies, apparatuses and motor assemblies that include superhard bearing pads having discrete sub-superhard bearing elements configured to impart a selected amount of heat transfer and/or hydrodynamic film formation. In an embodiment, a bearing assembly may include a plurality of superhard bearing pads distributed circumferentially about an axis. At least some of the plurality of superhard bearing pads may include a plurality of sub-superhard bearing elements at least partially defining a bearing surface. At least some of the plurality of sub-superhard bearing elements may be spaced from one another by one or more voids to impart a selected amount of heat transfer and hydrodynamic film formation thereon during operation. The bearing assembly may also include a support ring that carries the plurality of superhard bearing pads. In addition, at least a portion of the sub-superhard bearing elements may extend beyond the support ring.

In an embodiment, a bearing apparatus may include a first bearing assembly. The first bearing assembly may include a first plurality of superhard bearing pads distributed circumferentially about an axis. At least some of the first plurality of superhard bearing pads may include a first plurality of sub-superhard bearing elements at least partially defining a bearing surface. At least some of the first plurality of sub-superhard bearing elements may be separated from one another by one or more voids to impart a selected amount of heat transfer and hydrodynamic film formation thereon during operation. The first bearing assembly may also include a first support ring that carries the first plurality of superhard bearing pads. At least a portion of the first sub-superhard bearing elements may extend above a first surface of the support ring. The bearing apparatus may also include a second bearing assembly including a second plurality of superhard bearing pads generally opposed the first plurality of superhard bearing pads of the first bearing assembly. The second bearing assembly may also include a second support ring that carries the second plurality of superhard bearing pads.

In an embodiment, a method for manufacturing a bearing assembly may include forming a plurality of sub-superhard bearing elements spaced from one another by one or more voids in a superhard table of at least one of a plurality of superhard bearing pads to impart a selected amount of heat transfer and hydrodynamic film formation thereon. The method may further include securing the plurality of superhard bearing pads to a support ring.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

FIG. 6C is an isometric view of a superhard bearing pad removed from the radial bearing assembly shown in FIG. 6A.

FIG. 6D is a top plan view of the superhard bearing pad shown in FIG. 6C.

DETAILED DESCRIPTION

Figure 1A:
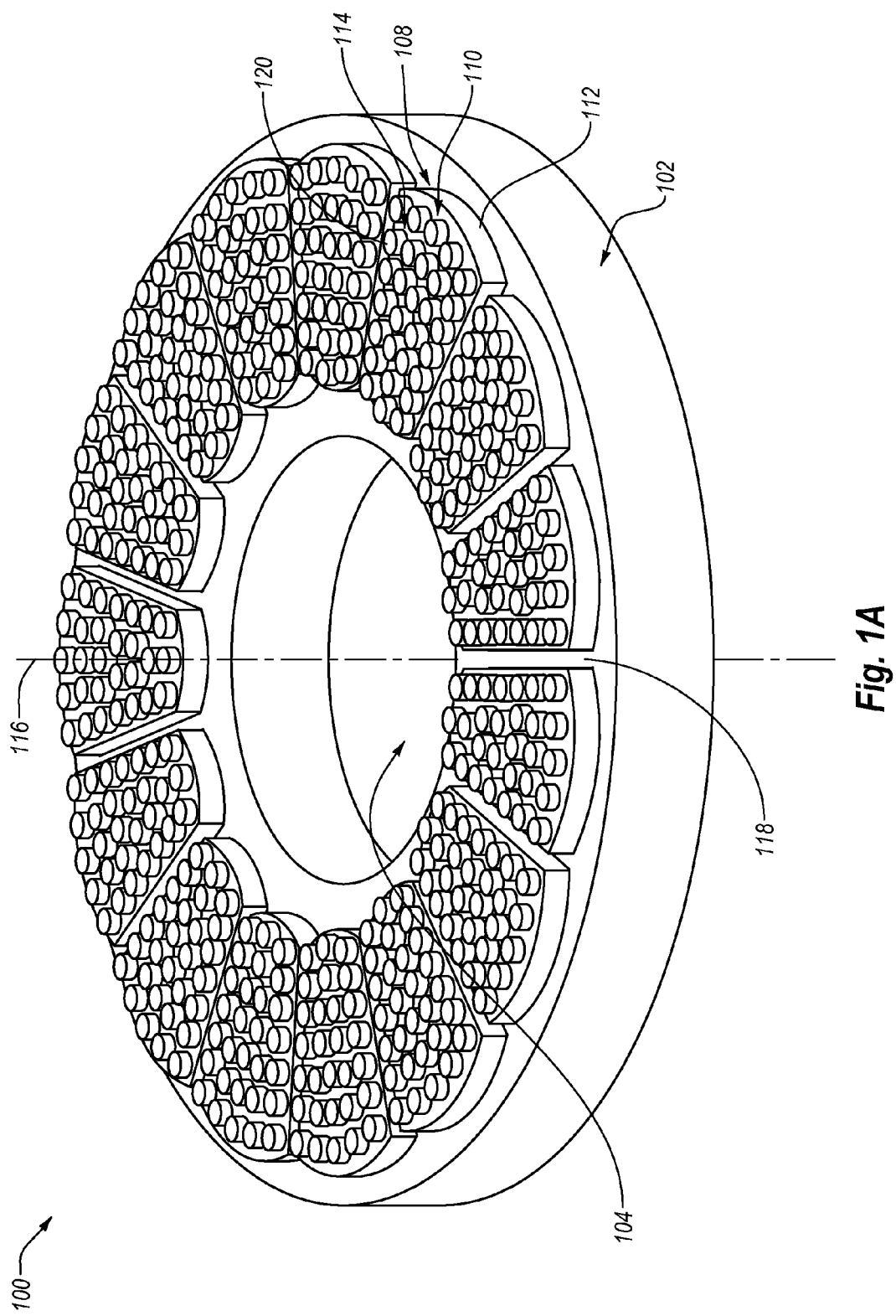
FIG. 1A is an isometric view of a thrust-bearing assembly according to an embodiment.
Figure 1B:
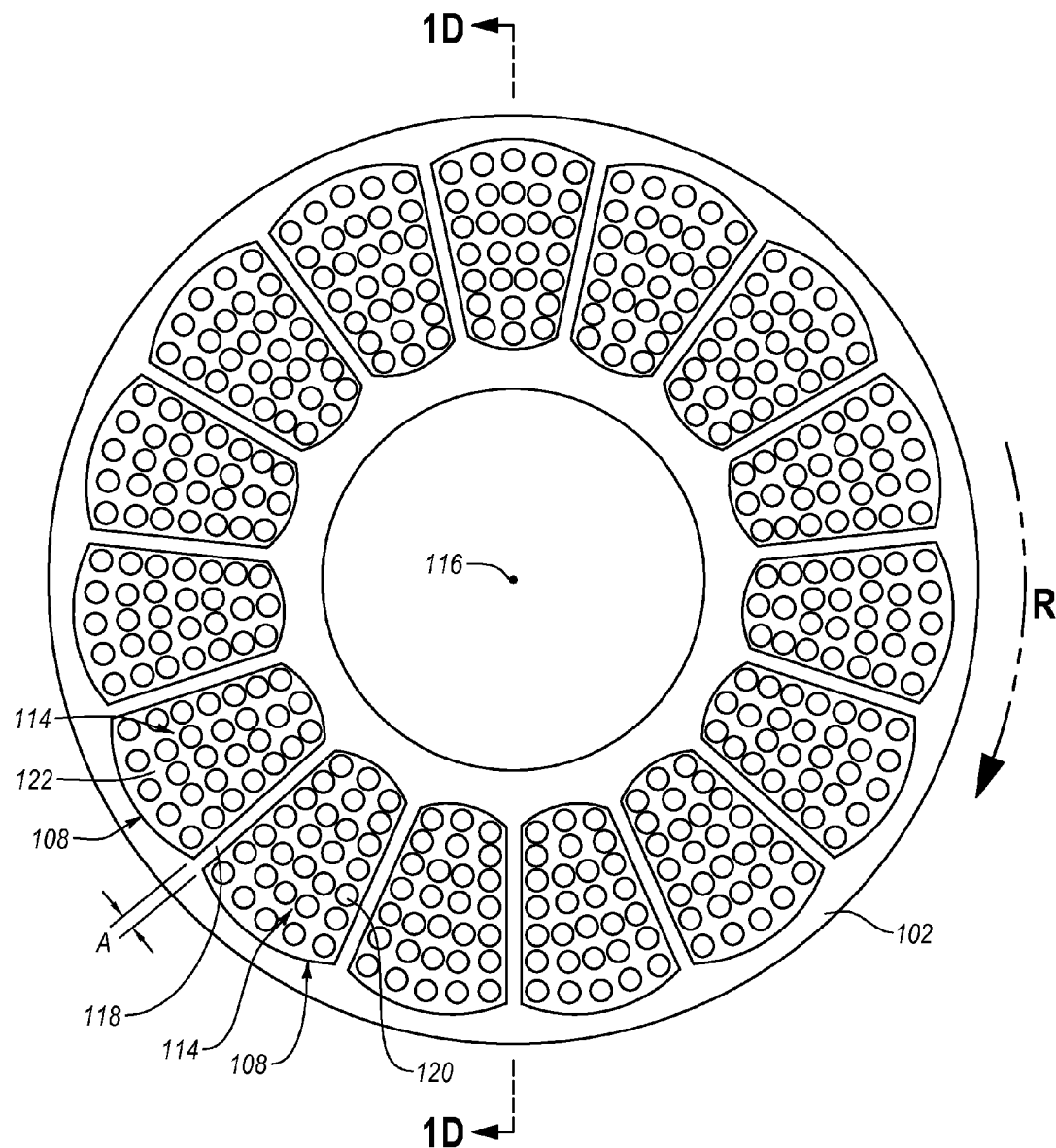
FIG. 1B is a top plan view of the thrust-bearing assembly shown in FIG. 1A.
Figure 1C:
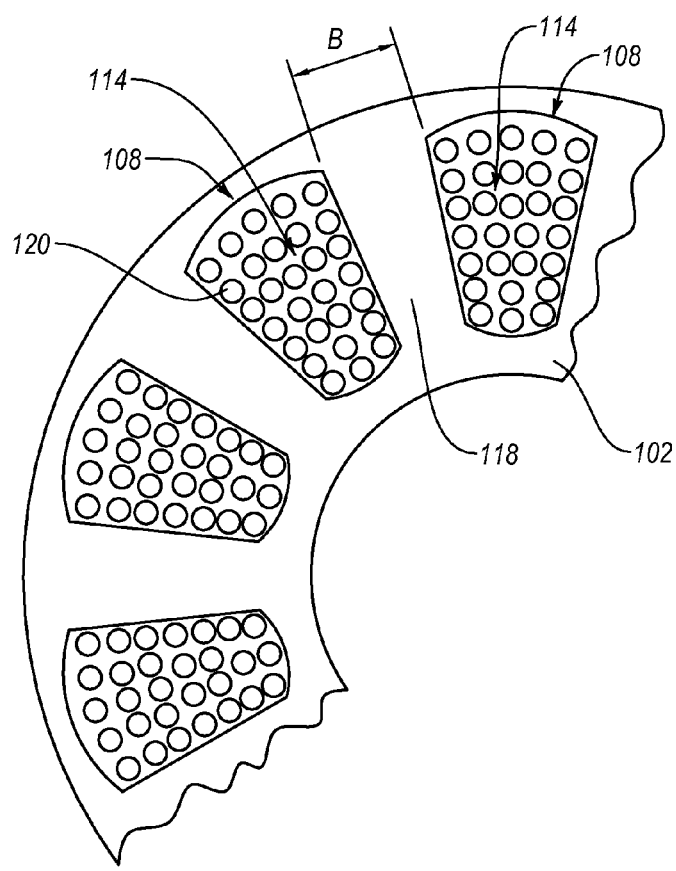
FIG. 1C is a partial top plan view of a thrust-bearing assembly according to another embodiment.
Figure 1D:
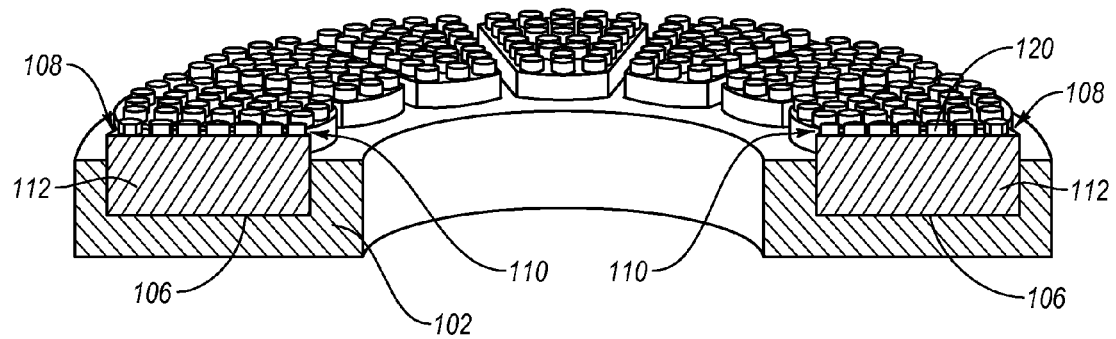
FIG. 1D is an isometric cutaway view taken along line 1D-1D of the thrust-bearing assembly shown in FIG. 1B.

Embodiments of the invention relate to bearing assemblies, apparatuses, and motor assemblies that include features configured to improve heat removal from the bearing assemblies and/or lubrication of superhard bearing pads thereof. FIGS. 1A, 1B, and 1D are isometric, top plan, and isometric cutaway views of a thrust-bearing assembly 100 according to an embodiment.

The thrust-bearing assembly 100 may form a stator or a rotor of a thrust-bearing apparatus used in a subterranean drilling system. In the illustrated embodiment, a support ring 102 is substantially cylindrical and defines an opening 104 through which a shaft (not shown) of, for example, a downhole drilling motor may extend. The support ring 102 may be generally circular and made from a variety of different materials. For example, the support ring 102 may comprise carbon steel, stainless steel, alloy steel, tungsten carbide, or any other suitable metal or conductive or non-conductive material. The support ring 102 may also include a plurality of recesses 106 (FIG. 1D) formed therein.

The thrust-bearing assembly 100 further may include a plurality of superhard bearing pads 108 each of which includes a substrate 112 and a superhard table 110 bonded to the substrate 112. The superhard bearing pads 108 are illustrated being distributed circumferentially about a thrust axis 116 along with a thrust force that may be generally directed during use. Each of the superhard bearing pads 108 may include a bearing surface 114. At least some of the superhard bearing pads 108 may include a plurality of discrete sub-superhard bearing elements 120 that collectively define the bearing surface 114 of the superhard table 110. As discussed in more detail below, variations in one or more of the size, shape, configuration, or spacing of the superhard bearing pads 108 and/or sub-superhard bearing elements 120 may help influence heat transfer and/or hydrodynamic fluid film development during use of the thrust-bearing assembly 100. For example, in the illustrated embodiment, each superhard bearing pad 108 may exhibit a generally sector or wedge-like geometric shape which may help develop a hydrodynamic fluid film as lubricating fluid flows over and/or around the thrust-bearing assembly 100. However, each superhard bearing pad 108 may also include the sub-superhard bearing elements 120 spaced and configured to help encourage developed flow of the lubricating fluid over the bearing surface 114 to facilitate heat removal. Thus, by balancing and/or utilizing different features in the thrust-bearing assembly 100, a desired amount of heat removal and/or hydrodynamic fluid film formation may be achieved.

As shown in FIGS. 1A and 1B, gaps 118 or other offsets may be located between adjacent ones of the superhard bearing pads 108. Optionally, the gaps 118 may be configured to assist with formation of a hydrodynamic film on the bearing surface 114. For example, the gaps 118 may be configured to limit lubricating fluid from being able to leak between adjacent superhard bearing pads 108. Depending upon the configuration and/or positioning of the supherhard bearing pads 108, the gaps 118 may exhibit a relatively small width A. For example, at least one of, some of, or all of the gaps 118 may exhibit a width A of about 0.005 mm to 2.5 mm, such as about 0.01 mm to 0.02 mm, or about 0.01 mm to 2 mm. As the gaps 118 decrease in size, it may become more difficult for fluid to flow between the superhard bearing elements 108. However, it should be noted that in at least some operational conditions, entrained lubricating fluid in the gaps 118 may assist with formation of a hydrodynamic film on at least some of the bearing surfaces 114. In other embodiments, the gaps 118 may exhibit widths that are relatively larger or smaller. For example, as shown in FIG. 1C, the gaps 118 may have a width B that is greater than the width A. As the width of the gaps 118 increases, the gaps 118 may be configured to improve heat transfer. For example, the gaps 118 may be configured to form flow paths for the lubricating fluid to flow over and/or around the superhard bearing elements 108. As the gaps 118 increase in size, fluid flow and heat transfer may more fully develop between adjacent superhard bearing pads 108. Thus, by varying the configuration and size of the gaps 118, the gaps 118 may be optionally configured to impart a desired amount of heat transfer and/or hydrodynamic film formation during operation.

Each of the superhard bearing pads 108 may be partially disposed in a corresponding one of the recesses 106 (shown in FIG. 1D) of the support ring 102 and secured partially therein via brazing, press-fitting, threadly attaching, fastening with a fastener, combinations of the foregoing, or another suitable technique. As used herein, a "superhard bearing pad" is a bearing pad including a bearing surface that is made from a material exhibiting a hardness that is at least as hard as tungsten carbide.

In any of the embodiments disclosed herein, the superhard bearing pads 108 may be made from a number of different superhard materials, such as polycrystalline diamond, polycrystalline cubic boron nitride, silicon carbide, tungsten carbide, or any combination of the foregoing superhard materials. For example, the superhard table 110 (FIG. 1C) may be formed from polycrystalline diamond and the substrate 112 (FIG. 1C) may be formed from cobalt-cemented tungsten carbide. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials from which the superhard bearing elements can be made disclosed in U.S. Pat. Nos. 7,866,418; 7,998,573; and 8,034,136 and U.S. patent application Ser. Nos. 11/545,929 and 11/983,619, the disclosure of each of the foregoing patents and applications is incorporated herein, in its entirety, by this reference.

The diamond particles that may be used to fabricate the superhard table 110 in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 30 µm, 20 µm, 15 µm, 12 µm, 10 µm, 8 µm) and another portion exhibiting at least one relatively smaller size (e.g., 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In some embodiments, the diamond particles may comprise three or more different sizes (e.g., one relatively larger size and two or more relatively smaller sizes), without limitation. Additionally, in any of the embodiments disclosed herein, the superhard bearing pads 108 may be free-standing (e.g., substrateless) and formed from a polycrystalline diamond body that is at least partially or fully leached to remove a metal-solvent catalyst initially used to sinter the polycrystalline diamond body. Optionally, one or more of the superhard bearing pads 108 may exhibit a peripherally extending edge chamfer. However, in other embodiments, the peripherally extending edge chamfer may be omitted.

The bearing surfaces 114 of each superhard bearing pad 108 may generally lie in a common plane with the bearing surfaces 114 of the other superhard bearing pads 108. For example, the superhard bearing pads 108 may be machined to tolerances and mounted in the support ring 102 and/or attached to the support ring 102 such that the bearing surfaces 114 of adjacent superhard bearing pads 108 are substantially coplanar.

The superhard bearing pads 108 may have any suitable individual shape. As shown best in FIGS. 1E and 1F, each superhard bearing pad 108 may have a generally wedge-shaped body including a first side surface 124, a second side surface 126 non-parallel to the first side surface 124, a first end surface 128, and a second end surface 130. In an embodiment, the first side surface 124 and the second side surface 126 of each of the superhard bearing pads 108 may extend between the first end surface 128 and the second end surface 130 and vice versa. At least one of the superhard bearing pads 108 may have a length L defined between the first end surface 128 and the second end surface 130. In addition, at least one of the superhard bearing pads 108 may have a width WS defined between the first side surface 124 and the second side surface 126. The width WS may vary between the first end surface 128 and the second end surface 130. In the illustrated embodiment, both the first end surface 128 and the second end surface 130 may have a convex curvature. As shown in FIG. 1B, the second end surface 130 may have a convex curvature to at least partially complement an outer peripheral surface of the support ring 102. In other embodiments, the first end surface 128 and the second end surface 130 may have symmetrical edge configurations, asymmetrical edge configurations, curved edge configurations, irregular edge configurations, or other edge configurations. For example, the first end surface 128 and the second end surface 130 may take the form of any portion of a circle, ellipse, square, rectangle, rhombus, triangle, or virtually any other simple, complex, regular, irregular, symmetrical, or non-symmetrical geometric shape. Moreover, the first end surface 128 may have an area less than an area of the second end surface 130, although this feature is not necessary. In other embodiments, the first end surface 128 and the second end surface 130 may be substantially the same size. In other embodiments, the superhard bearing pads 108 have a generally rectangular shape, a generally elliptical shape, a non-cylindrical shape, a generally cylindrically shaped body, or any other suitable shaped body.

In an embodiment, at least some of the superhard bearing pads 108 may include the discrete sub-superhard bearing elements 120. As shown best in FIGS. 1E and 1F, the sub-superhard bearing elements 120 may be arranged relative to each other to collectively define at least a portion of the bearing surface 114 of the superhard bearing pad 108. In an embodiment, the sub-superhard bearing elements 120 may extend between the bearing surface 114 and the substrate 112 such that the sub-superhard bearing elements 120 collectively form the superhard table 110 as shown in FIG. 1A. In other embodiments, the sub-superhard bearing elements 120 may extend between the bearing surface 114 and a portion of the superhard table 110 such that the sub-superhard bearing elements 120 form only a part of the superhard table 110 (shown in FIG. 2C). As described in more detail below, variations in one or more of the size, shape, configuration, or spacing of the superhard bearing pads 108 and/or sub-superhard bearing elements 120 may help influence heat transfer and/or hydrodynamic fluid film development during use of the thrust-bearing assembly 100.

The sub-superhard bearing elements 120 may be formed in any suitable manner, and no particular method for forming the sub-superhard bearing elements 120 is to be considered limiting. In an embodiment, the sub-superhard bearing elements 120 may be formed integrally with the superhard bearing pad 108. For example, the sub-superhard bearing elements 120 may be formed by electro-discharge machining ("EDM"), laser-cutting, grinding, combinations thereof, or otherwise machining the sub-superhard bearing elements 120 from the superhard table 110. For instance, suitable laser-cutting techniques are disclosed in U.S. patent application Ser. No. 13/166,007 filed on Jun. 22, 2011, the disclosure of which is incorporated herein, in its entirety by this reference. In other embodiments, the sub-superhard bearing elements 120 may be formed during formation (i.e., sintering) of the superhard table 110. For example, the sub-superhard bearing elements 110 may be formed directly on the substrate 112. In an embodiment, the substrate 112 may include a form or skeleton structure on a top portion on the substrate 112. The form or skeleton structure may include slots, grooves, openings, or combinations thereof having dimensions that generally correspond to the dimensions of the sub-superhard bearing elements 120. To form the sub-superhard bearing elements 120, the slots, grooves, or openings of the skeleton structure may be filled with diamond particles and the substrate may be placed in a canister. The diamond particles within the slots, grooves, or openings may then be subjected to a high-pressure/high temperature sintering process to form polycrystalline diamond such that the slots, grooves, or openings of the skeleton generally define the geometry of the polycrystalline diamond formed therein. After the polycrystalline diamond is formed, the form or skeleton structure may be removed from the substrate 112 via etching, laser cutting, grit blasting, combinations thereof, or other suitable removal techniques such that generally only the polycrystalline diamond previously formed within the slots, grooves, or openings remains to define the sub-superhard bearing elements 120 extending from and bonded to the substrate 112. In an embodiment, the form or skeleton structure may have a perforated plate-like configuration. In other embodiments, the form or skeleton structure may have a honeycomb-like configuration, a fractal configuration, a crosshatch-like configuration, or any other suitable configuration or structure.

In another embodiment, the sub-superhard bearing elements 120 may be formed using one or more sacrificial materials to define the sub-superhard bearing elements 120 during formation (i.e., sintering) of the superhard table 110. In an embodiment, the one or more sacrificial materials may include metals (e.g., tungsten), alloys (e.g., tungsten alloy), ceramics (e.g., tungsten carbide that is blasted away after sintering), combinations thereof, or other suitable materials. Once the sub-superhard bearing elements 120 are defined, the one or more sacrificial materials may be removed via leaching, thermal decomposition, combinations thereof, or other removal techniques. In yet other embodiments, the sub-superhard bearing elements 120 may be formed using net shape processes. For example, a form having general dimensions corresponding to the dimensions of the sub-superhard bearing elements 120 may be placed in a canister. The superhard table 110 may then be formed (i.e., sintering) in the canister. Once the superhard table 110 is formed, the superhard table 110 may be removed from the canister and the material of the form may be removed from the superhard table 110 to produce net or near net-shape sub-superhard bearing elements 120 in the superhard table 110. In other embodiments, the form may have dimensions such that when the superhard table 110 is removed from the canister and the material of the form is removed, the superhard table 110 comprises the sub-superhard bearing elements 120.

Figure 1E:
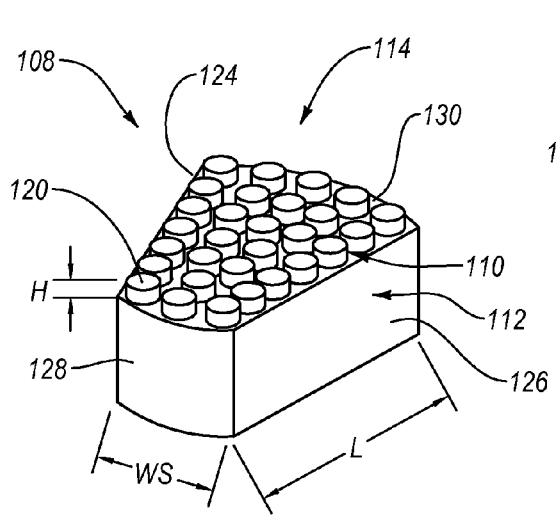
FIG. 1E is an isometric view of a superhard bearing pad removed from the thrust-bearing assembly shown in FIG. 1A.
Figure 1F:
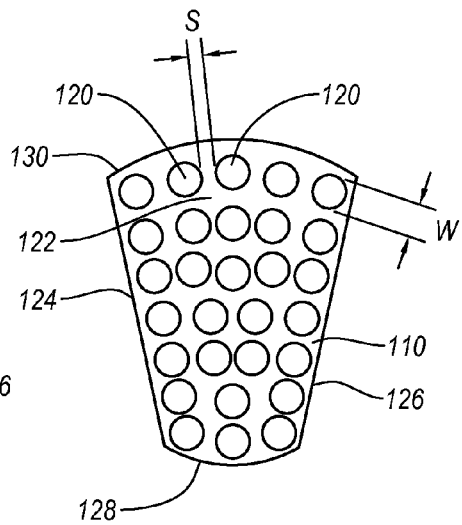
FIG. 1F is a top plan view of the superhard bearing pad shown in FIG. 1E.

As also shown in FIGS. 1E and 1F, each of the sub-superhard bearing elements 120 may have any suitable individual shape including a height H and a width W. For example, each sub-superhard bearing element 120 may have a generally cylindrical shaped body. In an embodiment, the sub-superhard bearing elements 120 may be arranged or formed in a staggered pattern. In other embodiments, the sub-superhard bearing elements 120 may be positioned in one or more rows, in one or more grouping, in repeating or irregular patterns, or in any other suitable configuration. One or more of the sub-superhard bearing elements have may a generally cylindrical geometric shape, a generally hexagonal geometric shape, an irregular geometric shape, a generally rounded rectangular geometric shape, combinations thereof, or the like.

The sub-superhard bearing elements 120 may be spaced from one another by one or more voids 122 substantially free of material therebetween. The voids 122 may be interconnected and defined at least partially by a width S extending between adjacent ones of the sub-superhard bearing elements 120. In other embodiments, some or all of the voids 122 may be disconnected. The width S of the voids 122 may be vary, generally uniform, non-uniform, combinations thereof, or the like. Alone or in combination with the gaps 118, and optionally, the sub-superhard bearing elements 120 and/or the voids 122 may be configured to assist with formation of a hydrodynamic film on the bearing surface 114. For example, the voids 122 may be configured to limit lubricating fluid from being able to leak between adjacent sub-superhard bearing elements 120. Depending upon the positioning and/or spacing of the sub-superhard bearing elements 120, all or a portion of the voids 122 may comprise a relatively small width S. For example, the one or more voids 122 may have a width S of about 0.001 mm to about 3.5 mm, more particularly a width of about 0.0025 mm to about 2.5 mm, and more particularly a width of about 0.125 mm to about 1.25 mm. More particularly still, the one or more voids 122 may have a width S from about 0.005 mm up to about 1.0 mm. In another embodiment, the one or more voids 122 may have a width S from about 0.005 mm up to about 0.50 mm. As the voids 122 decrease in size, it may become more difficult for fluid to flow between the sub-superhard bearing elements 120 and leak from the bearing surface 114. However, it should be noted that in at least some operational conditions, entrained lubricating fluid in the one or more voids 122 may assist with formation of a hydrodynamic film on the bearing surface 114. In other embodiments, the voids 122 may exhibit widths S that are relatively larger or smaller.

As the voids 122 increase in size, it may become easier for fluid to flow between the sub-superhard bearing elements 120. Alone or in combination with the gaps 118, and optionally, the sub-superhard bearing elements 120 and/or the voids 122 may be configured to improve heat transfer. For example, the voids 122 may exhibit widths S to form flow paths, in one or more directions, configured to allow lubricating fluid to flow between the sub-superhard bearing elements 120. Depending upon the positioning and/or spacing of the sub-superhard bearing elements 120, all or a portion of the voids 122 may form a relatively large number of flow paths around the sub-superhard bearing elements 120. For example, the voids 122 may form between about 1 and 1000 flow paths, more particularly between about 100 and 900 flow paths, and more particularly between about 200 and 800 flow paths. As the number of flow paths around the sub-superhard bearing elements 120 increase, the surface area of the superhard table 110 in contact with the lubricating fluid may increase to improve heat dissipation. In other embodiments, the sub-superhard bearing elements 120 and/or the voids 122 may also be configured to form one or more irregular or tortuous flow paths on the superhard table 110 to increase the residence time of the lubricating fluid in contact with the superhard table 110. Thus, by varying the configuration and size of the sub-superhard bearing elements 120 and/or the voids 122, the superhard bearing pads 108 may be configured to impart a desired amount of heat transfer and/or hydrodynamic fluid film formation during operation. For example, in an embodiment, the superhard bearing pads 108 may be configured to influence hydrodynamic fluid film formation in a shorter amount of time.

In an embodiment, the relationship between the width S of the voids 122 and the width W of the sub-superhard bearing elements may be configured to influence heat transfer and/or hydrodynamic fluid film formation. For example, the width S of at least one of the voids 122 may be at least one percent (1%); about five percent (5%); about ten percent (10%), about thirty percent (30%); about fifty percent (50%); about sixty percent (60%); about seventy percent (70%); about ninety percent (90%) of the width W of at least one of the sub-superhard bearing elements 120. In other configurations, the width S of voids 122 and the width W of the sub-superhard bearing elements 120 may be larger or smaller relative to each other.

In an embodiment, the relationship between the width S of the voids 122 and the length L or width WS of the superhard bearing pads 108 may be configured to influence heat transfer and/or hydrodynamic fluid film formation. For example, the width S of at least one of the voids 122 may be at least: about half percent (0.5%); about one percent (1%); about five percent (5%); about fifteen percent (15%); about twenty five (25%); about thirty percent (30%); or about fifty percent (50%) of the length L or width WS of at least one of the superhard bearing pads 108. In other embodiments, the width S of the voids 122 and the length L or width WS of the superhard bearing pads 108 may be larger or smaller relative to each other.

In an embodiment, the density or number of sub-superhard bearing elements 120 on one or more of the superhard bearing pads 108 may be configured to influence heat transfer and/or hydrodynamic fluid film formation. For example, the number of sub-superhard bearing elements 120 may be at least: about two (2); about five (5); about ten (10); about thirty (30); about fifty (50); about one hundred (100); or about five hundred (500) on each superhard bearing pad 108. In other embodiments, the density or number of sub-superhard bearing elements on one or more superhard bearing pads may be greater or less.

Figure 2A:
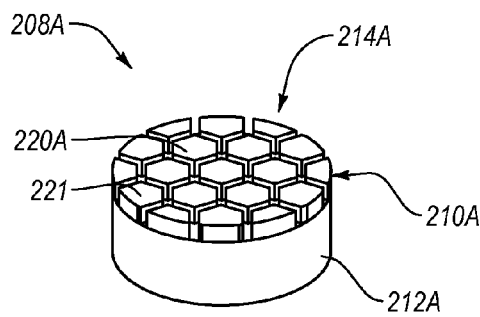
FIG. 2A is an isometric view of a superhard bearing pad according to an embodiment.

While the sub-superhard bearing elements 120 are show having similar sizes and configurations, in other embodiments, the sub-superhard bearing elements 120 may exhibit sizes and/or configurations that vary. For example, one or more of the sub-superhard bearing elements 120 may have varying body shapes. Specifically, one or more of the sub-superhard bearing elements 120 may have a generally diamond shaped body, a generally elliptical shaped body, a generally hexagonal shape, a generally rounded rectangular shaped body, combinations thereof, or any other suitable shaped body. For example, FIG. 2A illustrates a superhard bearing pad 208A according to an embodiment exhibiting a honeycomb-like configuration. The superhard bearing pad 208A may include a generally cylindrical body and may include a substrate 212A and a superhard table 210A bonded to the substrate 212A. In the illustrated embodiment, the superhard table 210A may comprise a plurality of sub-superhard bearing elements 220A at least partially defining a bearing surface 214A. The sub-superhard bearing elements 220A may extend between the bearing surface 214A and the substrate 212A. In other embodiments, the sub-superhard bearing elements 220A may extend between the bearing surface 214A and a portion of the superhard table 210A. The sub-superhard bearing elements 220A may be spaced from one another by one or more interconnected voids 222A and may have bodies exhibiting whole and/or partial hexagonal geometric shapes such that the superhard bearing pad 208A exhibits a honeycomb-like structure. Such a configuration may enhance heat removal by improved flow distribution, increasing surface area, and/or directing heat away from the superhard bearing pad 208A.

Figure 2B:
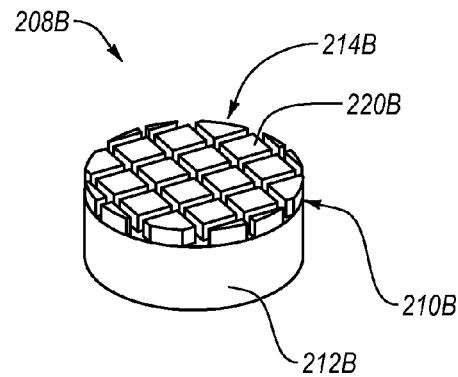
FIG. 2B is an isometric view of a superhard bearing pad according to an embodiment.

FIG. 2B illustrates a superhard bearing pad 208B according to another embodiment exhibiting a hatch-like configuration. The superhard bearing pad 208B may include a generally cylindrical body and may include a substrate 212B and a superhard table 210B bonded to the substrate 212B. In the illustrated embodiment, the superhard table 210B may comprise a plurality of sub-superhard bearing elements 220B at least partially defining a bearing surface 214B. In an embodiment, the sub-superhard bearing elements 220B may extend between the bearing surface 214B and the substrate 212B. In other embodiments, the sub-superhard bearing elements 220B may extend between the bearing surface 214B and a portion of the superhard table 210B. At least some of the sub-superhard bearing elements 220B may be spaced from one another by one or more voids 222B and may have generally quadrilateral bodies. The voids 222B and the superhard bearing elements 220B may be arranged such that the sub-superhard bearing elements 220B and voids 222B form a hatch-like pattern on the superhard bearing pad 208B. Such a configuration may enhance heat removal by increasing surface area and/or cross flow of the lubricating fluid through the sub-superhard bearing elements 220B. In addition, the sub-superhard bearing elements 220B may also be configured to influence hydrodynamic film formation by encouraging directional flow of the lubricating fluid over and/or on the superhard bearing pad 208B.

Figure 2C:
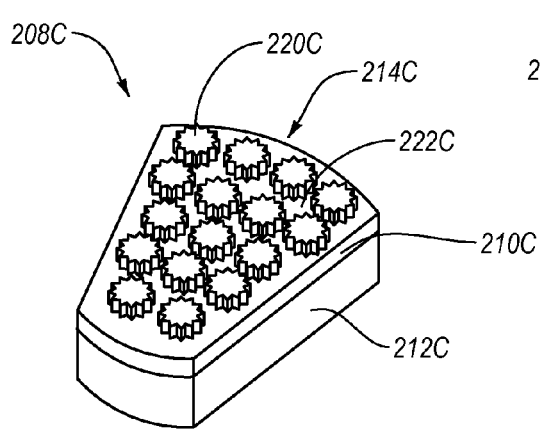
FIG. 2C is an isometric view of a superhard bearing pad according to an embodiment.
Figure 2D:
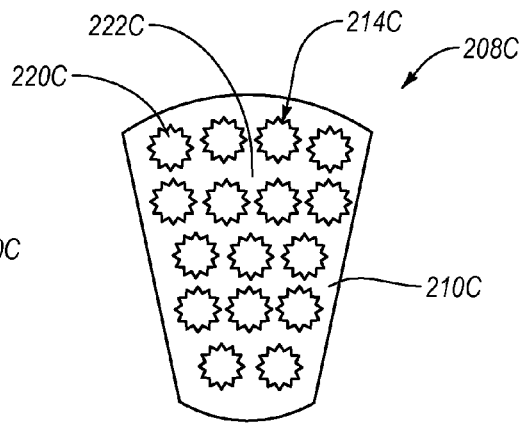
FIG. 2D is a top plan view of the superhard bearing pad shown in FIG. 2C.

FIGS. 2C and 2D illustrate a superhard bearing pad 208C according to yet another embodiment. The superhard bearing pad 208C may include a substrate 212C, a superhard table 210C bonded to the substrate 212C, and a bearing surface 214C of the superhard table 210C. The bearing surface 214C may be at least partially defined by a plurality of discrete sub-superhard bearing elements 220C. The sub-superhard bearing elements 220C may be spaced from one another by one or more voids 222C. In the illustrated embodiment, the sub-superhard bearing elements 220C may extend between the bearing surface 214C and the substrate 212C thereby collectively forming the superhard table 210C. In other embodiments, the sub-superhard bearing elements 220C may extend between the bearing surface 214C and a portion of the superhard table 210C. As shown, each sub-superhard bearing element 220C may have a generally cylindrical gear-like shaped body including a plurality of v-shaped grooves about the periphery of the sub-superhard bearing element 220C. The v-shaped grooves may extend along a longitudinal axis of the sub-superhard bearing element 220C. Optionally, the sub-superhard bearing elements 220C may be configured to influence heat removal by the increasing surface area of the sub-superhard bearing elements 220C in contact with the lubricating fluid and by creating an irregular flow path for the lubricating fluid to flow. In addition, by varying the width of the voids 222C, the sub-superhard bearing elements 220C may also be configured to influence hydrodynamic film formation by limiting leakage of lubricating fluid between adjacent sub-superhard bearing elements 220C.

Figure 2E:
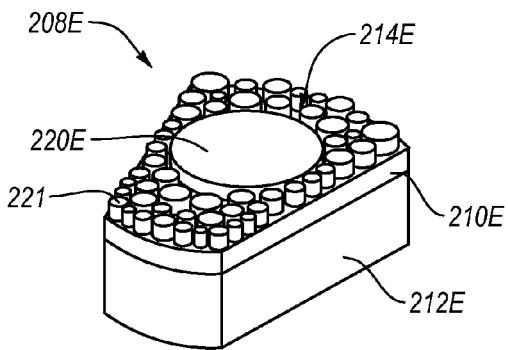
FIG. 2E is an isometric view of a superhard bearing pad according to an embodiment.

The superhard bearing pads 208 may also include sub-superhard bearing elements of varying sizes. For example, FIG. 2E is an isometric view of a superhard bearing pad 208E according to another embodiment. The superhard bearing pad 208E may include a substrate 212E, a superhard table 210E bonded to the substrate 212E, and a bearing surface 214E. The bearing surface 214E may be at least partially defined by a plurality of discrete sub-superhard bearing elements including a central, larger sub-superhard bearing element 220E surrounded by a plurality of smaller sub-superhard bearing elements 221. In the illustrated embodiment, the sub-superhard bearing elements 220E, 221 may extend between the superhard bearing table 210E and the bearing surface 214E. In other embodiments, the sub-superhard bearing elements 220E, 221 may extend between the substrate 212E and the bearing surface 214E. Such a configuration may provide a larger bearing surface in addition to a number of different flow paths for the lubricating fluid to flow. In other embodiments, the sub-superhard bearing elements 220 may exhibit fractal geometry. A fractal is a geometric shape that can be subdivided in parts, each of which is (at least proximately) a smaller copy of the whole. For example, the superhard bearing pad 220 may include a cylindrical body and a bearing surface 214 comprising a plurality of cylindrical sub-superhard bearing elements of varying sizes.

Figure 2F:
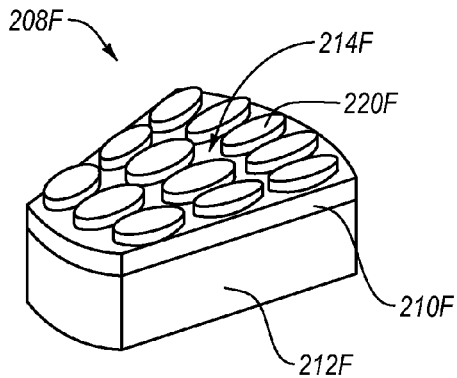
FIG. 2F is an isometric view of a superhard bearing pad according to an embodiment.

FIG. 2F is an isometric view of a superhard bearing pad 208F according to another embodiment. The superhard bearing pad 208F may include a substrate 212F, a superhard table 210F bonded to the substrate 212F, and a bearing surface 214F. The bearing surface 214F may be at least partially defined by a plurality of discrete sub-superhard bearing elements 220F having elliptical-like shaped bodies. In the illustrated embodiment, the sub-superhard bearing elements 220F may extend between the superhard bearing table 210F and the bearing surface 214F. In other embodiments, the sub-superhard bearing elements 220F may extend between the substrate 212F and the bearing surface 214F.

Figure 3A:
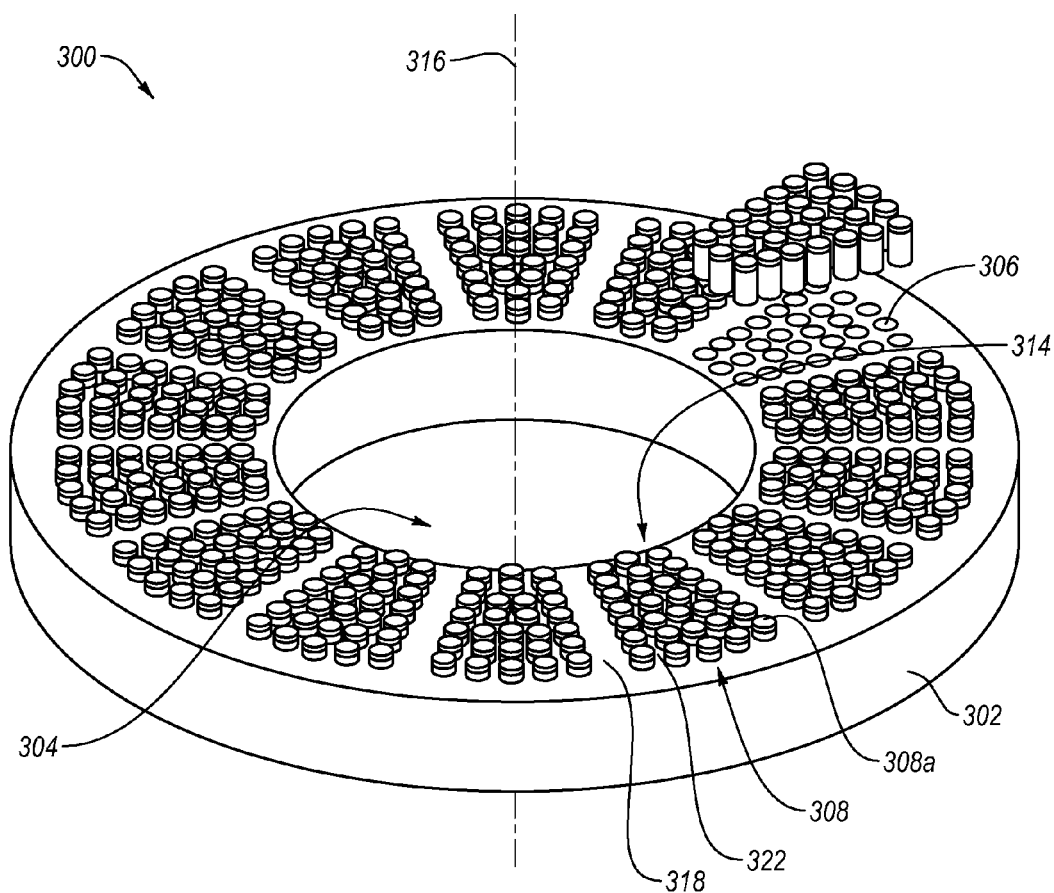
FIG. 3A is an isometric view of a thrust-bearing assembly according to an embodiment.

FIG. 3A is an isometric partially exploded view of a thrust-bearing assembly 300 according to another embodiment. The bearing assembly 300 may include a support ring 302 that carries a plurality of circumferentially-spaced superhard bearing pad groupings 308. The superhard bearing element pads 308 may generally have a wedge-like shape or a generally trapezoidal geometry, and may be distributed about a thrust axis 316, along which a thrust force may be generally directed during use. Each superhard bearing pad grouping 308 may be located circumferentially adjacent to another superhard bearing pad grouping 308, with a gap 318 or other offset therebetween. For instance, the gap 318 may separate adjacent superhard bearing element groupings 308 by a distance of about 2.0 mm to about 20.0 mm, or more particularly a distance of about 3.5 mm to about 15 mm, although the separation distance may be greater or smaller. The support ring 302 may also include an inner, peripheral surface defining a central aperture 304. The aperture 304 may be generally centered about the thrust axis 316, and may be adapted to receive a shaft (e.g., a downhole drilling motor shaft).

Figure 3B:
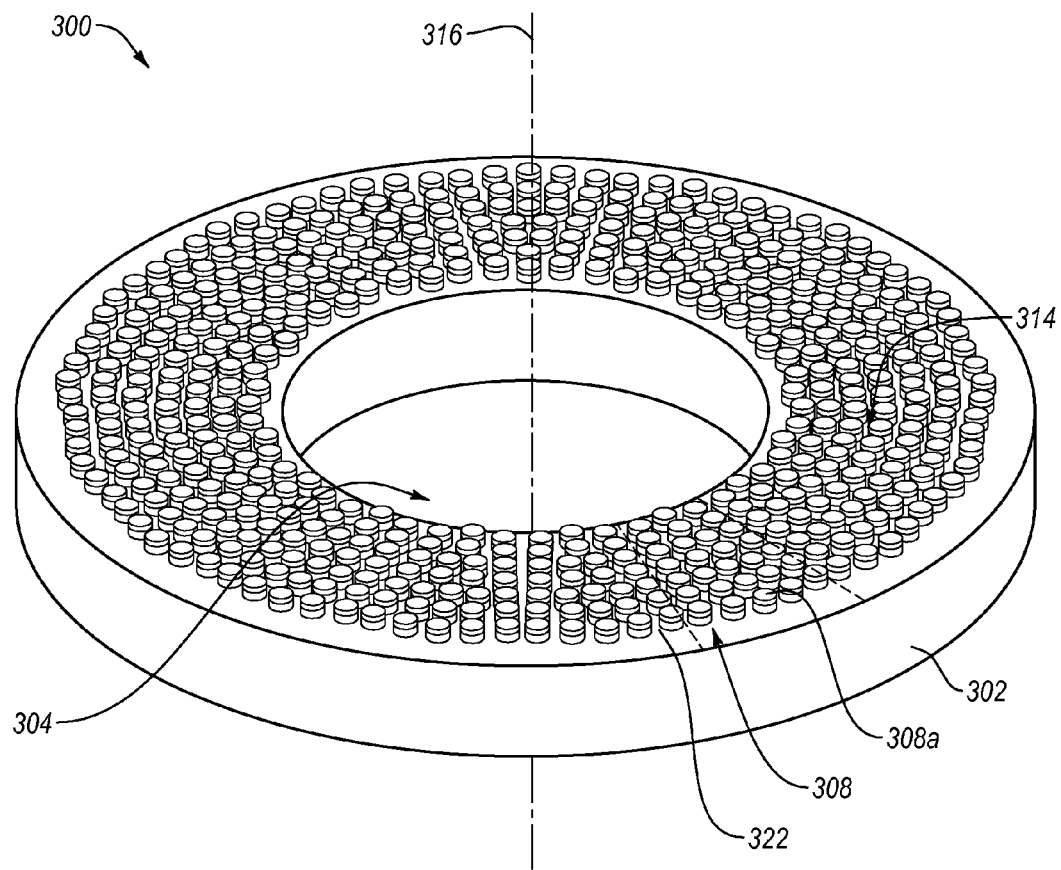
FIG. 3B is an isometric view of a thrust-bearing assembly according to another embodiment.

As shown, each superhard bearing pad groupings 308 may comprise a plurality of sub-superhard bearing elements. For example, the superhard bearing element pads 308 may include multiple sub-superhard bearing elements 308a arranged relative to each other to collectively define a bearing surface 314 for each superhard bearing pad grouping 308. Each of the sub-superhard bearing pads 308a may be partially disposed in a corresponding one of the recesses 306 of the support ring 302 and secured partially therein via brazing, press-fitting, threadly, attaching, fastening with a fastener, combinations of the foregoing, or another suitable technique. The sub-superhard bearing elements 308a may have any suitable shape. For example, each sub-superhard bearing element 308a may have a generally cylindrical shaped body. In one embodiment, the sub-superhard bearing elements 308a may be spaced from one another by one or more voids 322. Optionally, the sub-superhard bearing elements 308a and/or the voids 322 may be configured to assist with formation of a hydrodynamic film on the bearing surface 314. For example, the voids 322 may be configured to limit lubricating fluid from being able to leak between adjacent sub-superhard bearing elements 308a. Optionally, the sub-superhard bearing elements 308a and/or the voids 322 may also be configured to improve heat transfer from the superhard bearing pad groupings 308. For example, the voids 322 and the sub-superhard bearing elements 308a may be configured to form flow paths configured to allow lubricating fluid to flow between the sub-superhard bearing elements 308a. Thus, by varying the configuration and size of the sub-superhard bearing elements 308a and/or the voids 322, the superhard bearing pad groupings 308 may be configured to impart a desired amount of heat transfer and/or hydrodynamic fluid film formation during operation. While the superhard bearing pads groupings 308 are illustrated having a generally wedge-like shape, the superhard bearing pads groupings 308 may have a generally cylindrical shape, a generally rectangular shape, a generally oval shape, or any other suitable shape. In other embodiments, the gaps 318 may be omitted. For example, as shown in FIG. 3B, the superhard bearing pad groupings 308 may be positioned substantially adjacent one another such that the superhard bearing pad groupings 308 form a quasi-continuous bearing surface 314 of discrete sub-superhard bearing elements 308a around the support ring 302. In yet other embodiments, the superhard bearing pad groupings 308 may be omitted and the sub-superhard bearing elements 308a may be positioned and configured to form a quasi-continuous bearing surface 314 around the support ring 302.

Figure 4A:
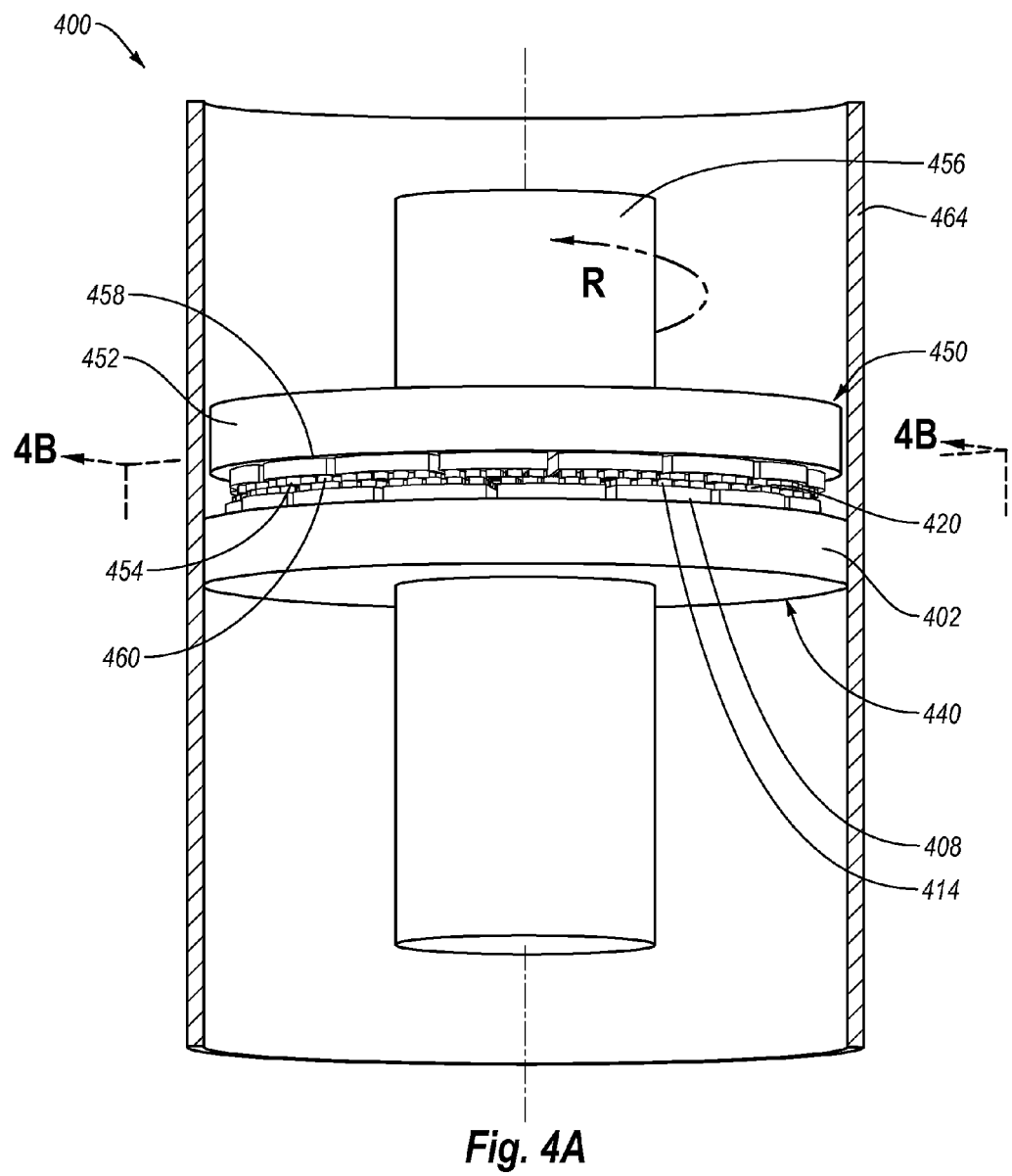
FIG. 4A is an isometric view of a thrust-bearing apparatus that may employ any of the disclosed thrust-bearing assemblies according to an embodiment.
Figure 4B:
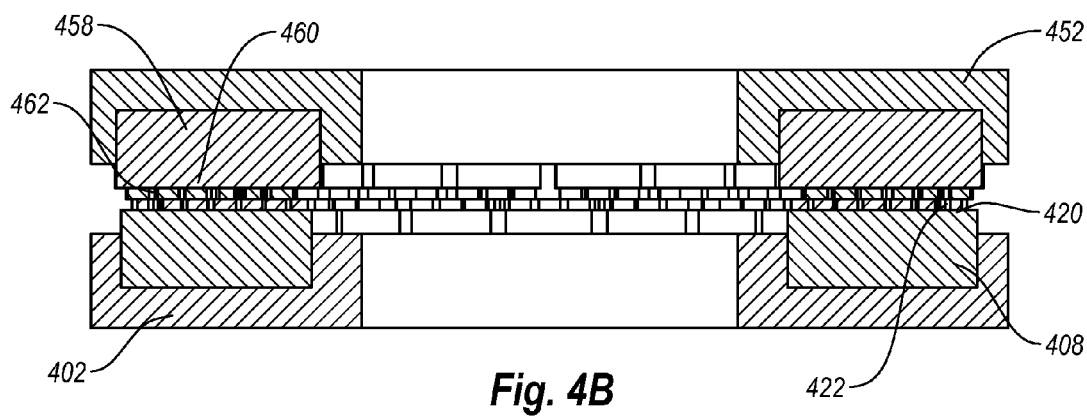
FIG. 4B is a cross-sectional view of the thrust-bearing apparatus shown in FIG. 4A take along line 4B-4B.

Any of the above described thrust-bearing assembly embodiments may be employed in a thrust-bearing apparatus. FIGS. 4A and 4B illustrate a thrust-bearing apparatus 400. The thrust-bearing apparatus 400 may include a stator 440. The stator 440 may include a plurality of circumferentially-adjacent superhard bearing pads 408 mounted or otherwise attached to a support ring 402, with each of the superhard bearing pads 408 having a bearing surface 414. The thrust-bearing apparatus 400 further may include a rotor 450. The rotor 450 may include a support ring 452 and a plurality of superhard bearing pads 458 mounted or otherwise attached to the support ring 452, with each of the superhard bearing pads 458 having a bearing surface 454.

In an embodiment, at least a portion of the superhard bearing pads 408 may include a plurality of sub-superhard bearing elements 420. The sub-superhard bearing elements 420 may be arranged relative to each other to collectively define at least a portion of the bearing surface 414 for each superhard bearing pad 408. The sub-superhard bearing elements 420 may be spaced from one another by one or more voids 422 and may exhibit, for example, the configuration of the sub-superhard bearing elements 120 or other sub-superhard bearing elements disclosed herein. The sub-superhard bearing elements 420 may be formed in a superhard table of the superhard bearing pads 408 or may be mounted or otherwise attached to the superhard table. In an embodiment, at least a portion of the superhard bearing pads 458 may include a plurality of sub-superhard bearing elements 460. The sub-superhard bearing elements 460 may be arranged relative to each other to collectively define at least a portion of the bearing surface 454 for each superhard bearing pad 458. The sub-superhard bearing elements 460 may be spaced from one another by one or more voids 462 and may exhibit, for example, the configuration of the sub-superhard bearing elements 120 or other sub-superhard bearing elements disclosed herein. The sub-superhard bearing elements 460 may be formed in a superhard table of the superhard bearing elements 458 or may be mounted or otherwise attached to the superhard table. As shown, a shaft 456 may be coupled to the support ring 452 and operably coupled to an apparatus capable of rotating the shaft 456 in a direction R (or in a generally opposite direction), such as a downhole motor. For example, the shaft 456 may extend through and may be secured to the support ring 452 of the rotor 450 by press-fitting or threadly coupling the shaft 456 to the support ring 452 or another suitable technique. A housing 464 may be secured to a support ring 402 of the stator 440 and may extend circumferentially about the shaft 456 and the rotor 450. In another embodiment only one of the rotor 450 or stator 440 may include one or more sub-superhard bearing elements.

In operation, the lubricating fluid (which may include, for example, lubricating fluid, drilling fluid, or mud) may be pumped between the shaft 456 and the housing 464, and through the thrust-bearing apparatus 400. The sub-superhard bearing elements 460 and/or the voids 462 may be configured and positioned to direct or interact with the lubricating fluid which in turn can reduce friction and/or increase heat dissipation. For example, the sub-superhard bearing elements 460 and voids 462 may form flow paths configured to direct the lubricating fluid over and/or around the superhard bearing pads 458 to enhance heat transfer. Moreover, under certain operational conditions the thrust-bearing apparatus 400 may be operated as a hydrodynamic bearing. For example, where the rotational speed of the rotor 450 is sufficient and the thrust load is sufficiently low, a hydrodynamic fluid film may develop between the bearing surfaces 414 of the stator 440 and the bearing surfaces 454 of the rotor 450. The sub-superhard bearing elements 460 and/or voids 462 on the rotor 450 may be sized and/or configured to help develop and/or maintain the lubricating fluid film by limiting leakage of the lubricating fluid between adjacent sub-superhard bearing elements 460. For example, by limiting leakage, the sub-superhard bearing elements 460 and/or voids 462 may encourage quicker development of the lubricating fluid film. The sub-superhard bearing elements 420 and/or voids 422 on the stator 440 may be sized and/or configured to help develop and/or maintain the lubricating fluid film by limiting leakage of the lubricating fluid between adjacent sub-superhard bearing elements 420. The fluid film can have sufficient pressure to prevent contact between the respective bearing surfaces and, thus, reduce wear of the superhard bearing pads 458 and the superhard bearing pads 408. In such a situation, the thrust-bearing apparatus 400 may be described as operating hydrodynamically. When the thrust loads exceed a certain value and/or the rotational speed of the rotor 450 is reduced, the pressure of the fluid film may not be sufficient to prevent the bearing surfaces 414 of the stator 440 and the bearing surfaces 454 of the rotor 450 from contacting each other. Thus, the thrust-bearing apparatus 400 may be operated to improve lubrication of the contact area between the bearing surfaces 414 of the stator 440 and the bearing surfaces 454 of the rotor 450 or as a hydrodynamic bearing. Accordingly, by varying the configuration and/or size of the sub-superhard bearing elements 460, 420 and/or the voids 462, 422 the superhard bearing elements 408, 458 may be configured to impart a desired amount of heat transfer and/or hydrodynamic fluid film formation during operation. It is noted that in other embodiments, the rotor or stator may be configured as any of the previously described embodiments of thrust-bearing assemblies.

Figure 5A:
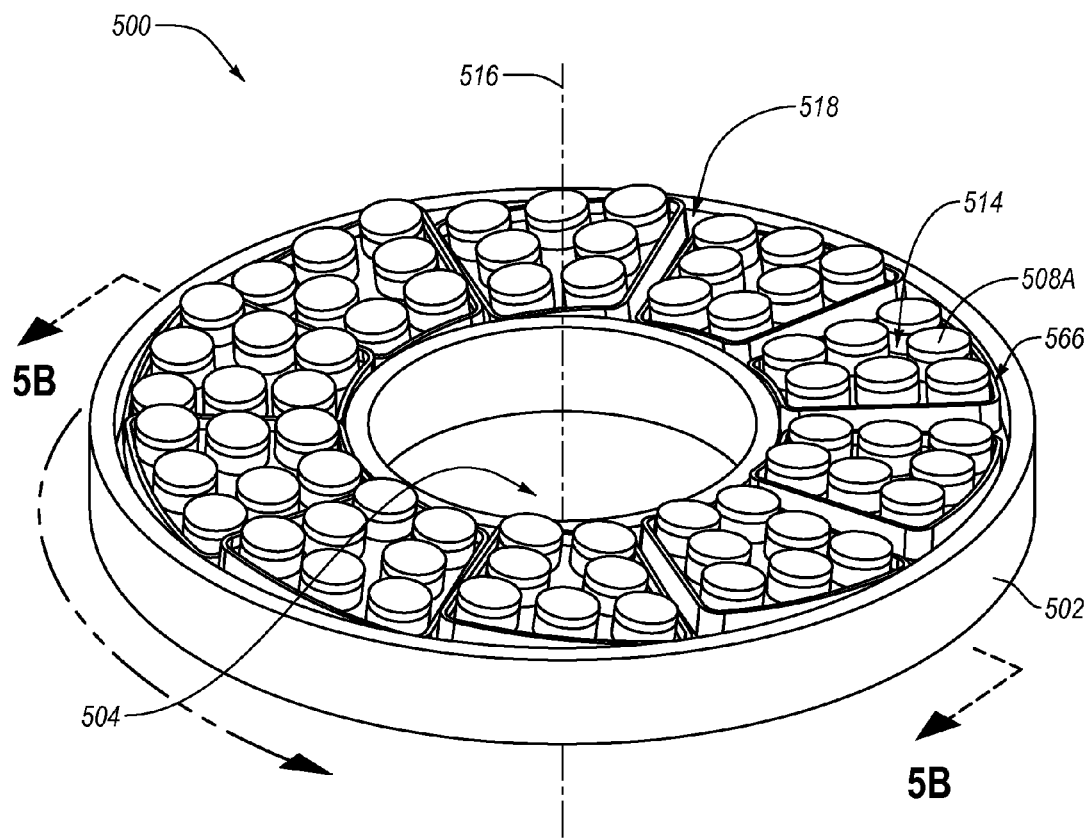
FIG. 5A is an isometric view of a tilting pad bearing assembly according to an embodiment.
Figure 5B:
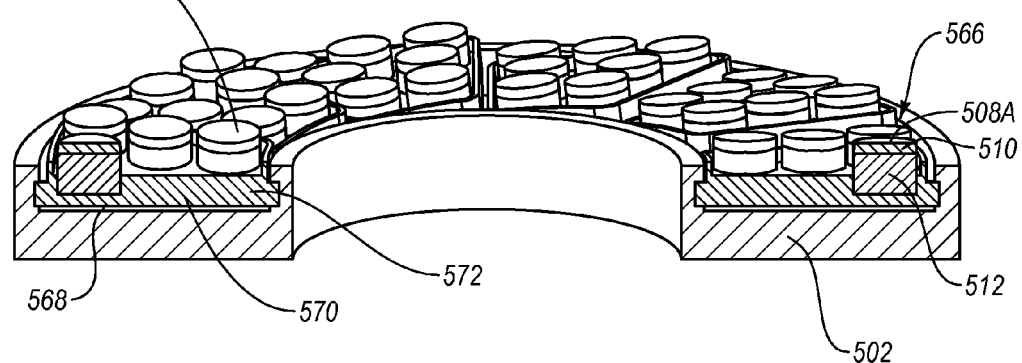
FIG. 5B is an isometric cut away view of the tilting pad bearing assembly shown in FIG. 5A taken along line 5B-5B.

The concepts used in the thrust-bearing assemblies and apparatuses described above may also be employed in tilt pad bearing assemblies and apparatuses. FIGS. 5A and 5B are isometric and isometric cutaway views, respectively, illustrating a tilt pad bearing assembly 500 according to an embodiment. The bearing assembly 500 includes a support ring 502 that carries a plurality of circumferentially spaced tilting pads 566. The tilting pads 566 may include, for instance, fixed tilting pads, adjustable tilting pads, self-establishing tilting pads, or combinations of the foregoing. As shown, the tilting pads 566 may generally have a wedge-like shape or a generally trapezoidal geometry, and may be distributed about a thrust-axis 516, along which a thrust force may be generally directed during use. Each tilting pad 566 may be located circumferentially adjacent to another tilting pad 566, with a gap 518 or other offset therebetween. For instance, the gap 518 may separate adjacent tilting pads 566 by a distance of about 2.0 mm to about 20.0 mm, or more particularly a distance of about 3.5 mm to about 15 mm, although the separation distance may be greater or smaller. For instance, as the size of the bearing assembly 500 increases, the size of the tilting pads 566 and/or the size of the gaps 518 may also increase. To support the tilting pads 566 of the bearing assembly 500, the support ring 502 may define a channel 568 and the tilting pads 566 may be placed within the channel 568. In other embodiments, the support ring 502 may define multiple pockets or otherwise define locations for tilting pads 566. The tilting pads 566 may then be supported or secured within the support ring 502 in any suitable manner. For instance, a pivotal connection may be used to secure the tilting pads 566 within the support ring 502, although any other suitable securement or attachment mechanism may also be utilized. The support ring 502 may also include an inner, peripheral surface defining a central opening 504. The central opening 504 may be generally centered about the thrust axis 516, and may be adapted to receive a shaft (e.g., a downhole drilling motor shaft).

As shown, each tilting pad 566 may include a plurality of sub-superhard bearing elements or superhard bearing elements 508A. The superhard bearing elements 508A may include a substrate 512; a superhard table 510 attached to the substrate 512, and may be made from any of the materials discussed above for the superhard bearing elements 108. The superhard bearing elements 508A may be arranged relative to each other to collectively define a bearing surface 514 for each tilting pad 566. In one embodiment, the titling pads 566 may be used in connection with a runner or other superhard bearing element. For example, the bearing assembly 500 may rotate relative to a runner while lubricating fluid floods the bearing assembly 500 and the runner. As the bearing assembly 500 is rotated relative to a runner, a hydrodynamic fluid film separating the runner from the bearing surfaces 514 may develop.

In the illustrated embodiment, the superhard bearing elements 508A of the tilting pad 566 (best shown in FIG. 5C) may be secured to a support plate 570. The support plate 570 may, for instance, be formed of a metal, an alloy, a cemented carbide material, other material, or any combination thereof. The substrate 512 of the superhard bearing elements 508A may be secured to the support plate 570 by brazing, welding, or other method. In other embodiments, the support plate 570 may define a pocket into which the superhard bearing elements 508A may be assembled and/or positioned. In an embodiment, the degree to which the tilting pads 566 rotate or tilt may be varied in any suitable manner. For instance, in an embodiment, the tilting pads 566 may be tilted about respective radial axes that extend radially from the thrust axis 516 and through each respective tilting pad 566.

In FIG. 5B, the support plate 570 may be attached to a pin 572. The pin 572 may be allowed to at least partially rotate, or may otherwise define or correspond to a tilt axis. The pin 572 may be used to allow the tilting pads 566 to selectively rotate. For instance, the tilting pads 566 may be self-establishing such that based on the lubricating fluid used, axial forces applied along the thrust-axis 516, the rotational speed of the runner or bearing assembly 500, other factors, or combinations of the foregoing, the tilting pads 566 may automatically or otherwise self-adjust to a desired tilt or other orientation. In still other embodiments, the tilting pads 566 may be fixed at a particular tilt, or may be manually set to a particular fit with or without being self-establishing.

Figure 5C:
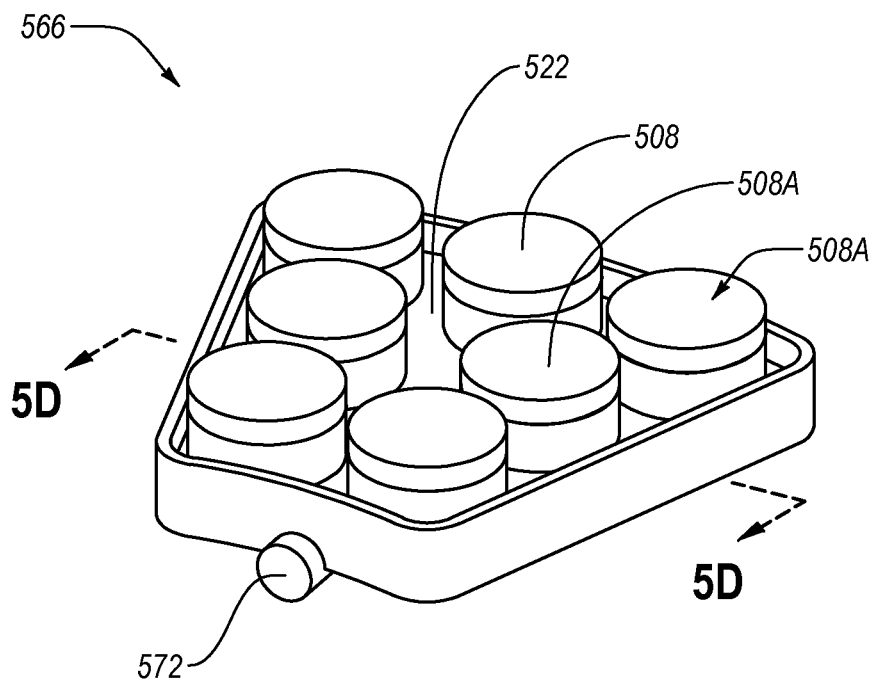
FIG. 5C is an isometric view of a tilting pad removed from the tilting pad bearing assembly shown in FIG. 5A.
Figure 5D:
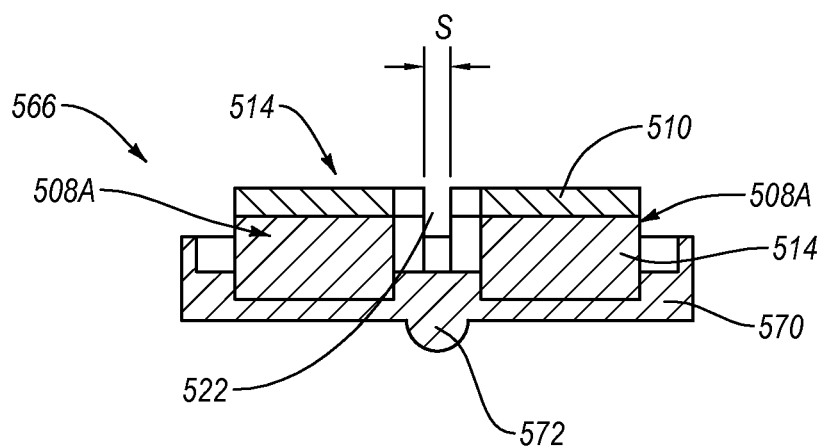
FIG. 5D is a cross-sectional view of the tilting pad shown in FIG. 5C taken along line 5D-5D.

FIGS. 5C and 5D are isometric and cross-sectional views, respectively, of a single tilting pad 566. The tilting pad 566 may include multiple sub-superhard bearing elements 508A collectively defining a superhard bearing pad 508. The bearing surface 514 of the superhard bearing pad 508 may be substantially planar, although such embodiment is merely illustrative. In other embodiments, the bearing surface 514 may be curved, or have another contour or topography. In the illustrated embodiment, six sub-superhard bearing elements 508A collectively define the wedge-like shaped superhard bearing pad 508, although more or fewer than six sub-superhard bearing elements may be provided. Any number of sub-superhard bearing elements may be used to form the bearing surface 514. For instance, a tilting pad 566 may be sized many times larger than the largest available size of a polycrystalline diamond compact ("PDC") or other material used to form a portion of the tilting pad 566, or may be small enough to be formed of a single PDC. By way of illustration, a tilting pad measuring 75 mm in circumferential width and 100 mm in length may include ten or more individual sub-superhard bearing elements 508a.

The sub-superhard bearing elements 508A may also each have any desired individual shape. By way of illustration, each sub-superhard bearing element 508A may have a generally cylindrical-shaped body. In other embodiments, the sub-superhard bearing elements 508A may have a non-cylindrical shape, a generally wedge-like shape, a generally elliptical shape, or any other suitable shape. In the illustrated embodiment, each of the sub-superhard bearing elements 508A may be spaced from one another by one or more voids 522. In other embodiments, only some of the sub-superhard bearing elements 508A may be spaced from one another by the voids 522. In an embodiment, the voids 522 may be configured to limit fluid from being able to leak through the sub-superhard bearing elements 508A. At least some of the voids 522 may be interconnected or at least some of the voids 522 may not be interconnected. Depending upon the number and size of the sub-superhard bearing elements 508A, the voids 522 may be relatively small. For example, one or more of the voids 522 may have a width S of about 0.001 mm to about 3.5 mm, more particularly a width of about 0.0025 mm to about 2.5 mm, and more particularly a width of about 0.125 mm to about 1.25 mm. More particularly still, the one or more voids 522 may have a width S from about 0.005 mm up to about 1.0 mm. In another embodiment, the one or more voids 522 may have a width S from about 0.005 mm up to about 0.50 mm. As the voids 522 decrease in size, it may become more difficult for fluid to flow between the sub-superhard bearing elements 508a and leak from the bearing surface 514.

Optionally, the voids 522 may be configured to help develop fluid flow and/or heat transfer. For example, the voids 522 may exhibit adequate widths to form flow paths configured to allow lubricating fluid to flow between adjacent sub-superhard bearing elements 508a. Thus, by varying the configuration and/or size of the sub-superhard bearing elements 508a and/or the voids 522, the tilting pads 566 may be configured to impart a desired amount of heat transfer and/or hydrodynamic fluid film formation during operation. Additional example embodiments of tilting pad bearing assemblies and apparatuses that may use the concepts disclosed herein are disclosed in co-pending U.S. patent application Ser. No. 13/089,725, filed Apr. 19, 2011, the disclosure of which is incorporated herein, in its entirety, by this reference.

Figure 6A:
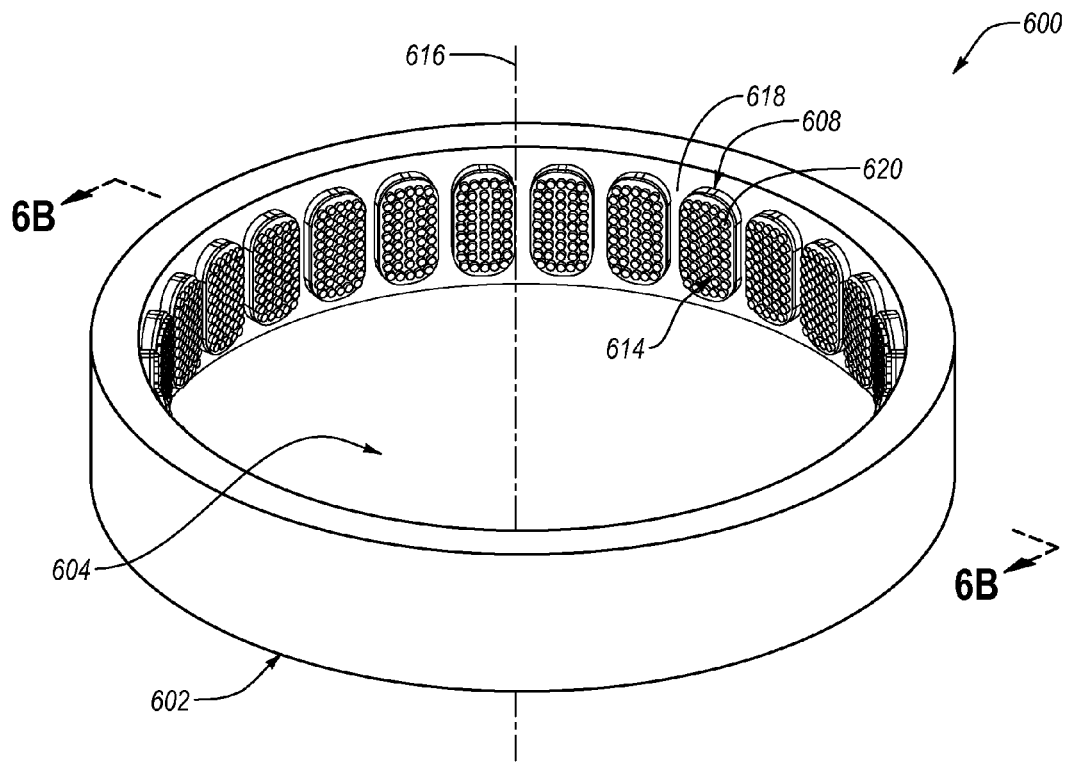
FIG. 6A is an isometric view of a radial bearing assembly according to an embodiment.
Figure 6B:
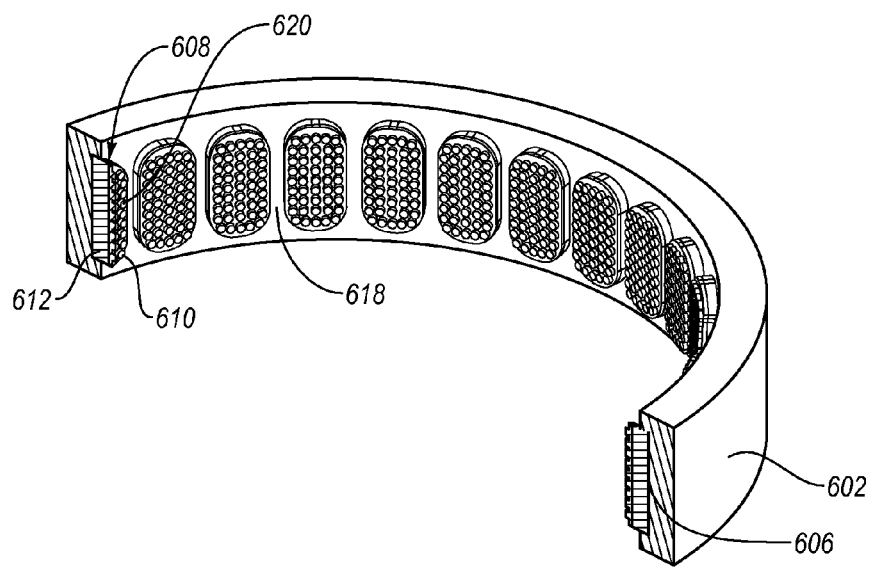
FIG. 6B is a cutaway view of the radial bearing assembly shown in FIG. 6A taken along line 6B-6B.

The concepts used in the tilt pad and thrust-bearing assemblies and apparatuses described above may also be employed in radial bearing assemblies and apparatuses. FIGS. 6A and 6B are isometric and isometric cutaway views, respectively, illustrating a radial bearing assembly 600 according to an embodiment. The radial bearing assembly 600 may include a support ring 602 extending about a rotation axis 616. The support ring 602 may define a central opening 604 and may include a plurality of superhard bearing pads 608 distributed circumferentially about the rotation axis 616. FIGS. 6C and 6D are isometric and top plan views illustrating a superhard bearing pad 608 removed from the support ring 602. Each superhard bearing pad 608 may include a superhard table 610 including a concavely-curved bearing surface 614 (e.g., curved to lie on an imaginary cylindrical reference surface). The superhard table 610 may be bonded or attached to a corresponding substrate 612. As discussed in more detail below, at least some of the superhard bearing pads 608 may include a plurality of discrete sub-superhard bearing elements 620. In an embodiment, the superhard bearing pads 608 may have a generally rounded rectangular-like shape and each may be made from any of the materials discussed above for the superhard bearing pads 108. In other embodiments, the superhard bearing pads 608 may have a non-cylindrical shape, a generally wedge-like shape, a generally oval shape, or any other suitable shape. The superhard bearing pads 608 may be circumferentially distributed in corresponding recesses 606 (shown in FIG. 6B) formed in the support ring 602 and arranged in single row. In other embodiments, the superhard bearing pads 608 may be circumferentially distributed in two rows, three rows, four rows, or any number of rows. Referring again to FIGS. 6A and 6B, gaps 618 or other offsets may be located between adjacent ones of the superhard bearing pads 608. Optionally, similar to the gaps 118, the gaps 618 may be configured to assist with formation of a hydrodynamic film on the bearing surface 614. For example, the gaps 618 may be configured to limit lubricating fluid from being able to leak between adjacent superhard bearing elements 608. Optionally, similar to the gaps 118, the gaps 618 may also be configured to improve heat transfer. For example, the gaps 618 may be configured to form flow paths for the lubricating fluid to flow over and/or around the superhard bearing elements 608.

Figure 6E:
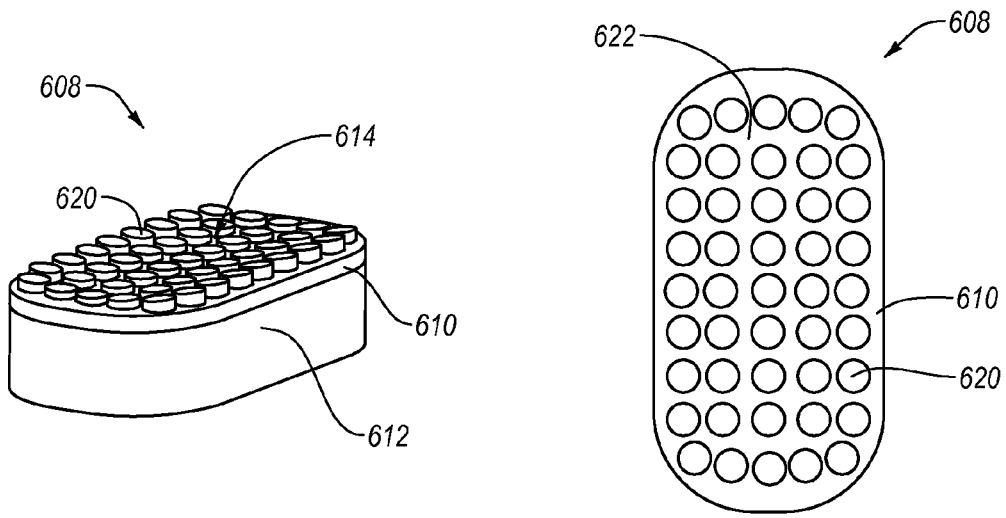
FIG. 6E is an isometric view of a radial bearing assembly according to another embodiment.
Figure 6E:
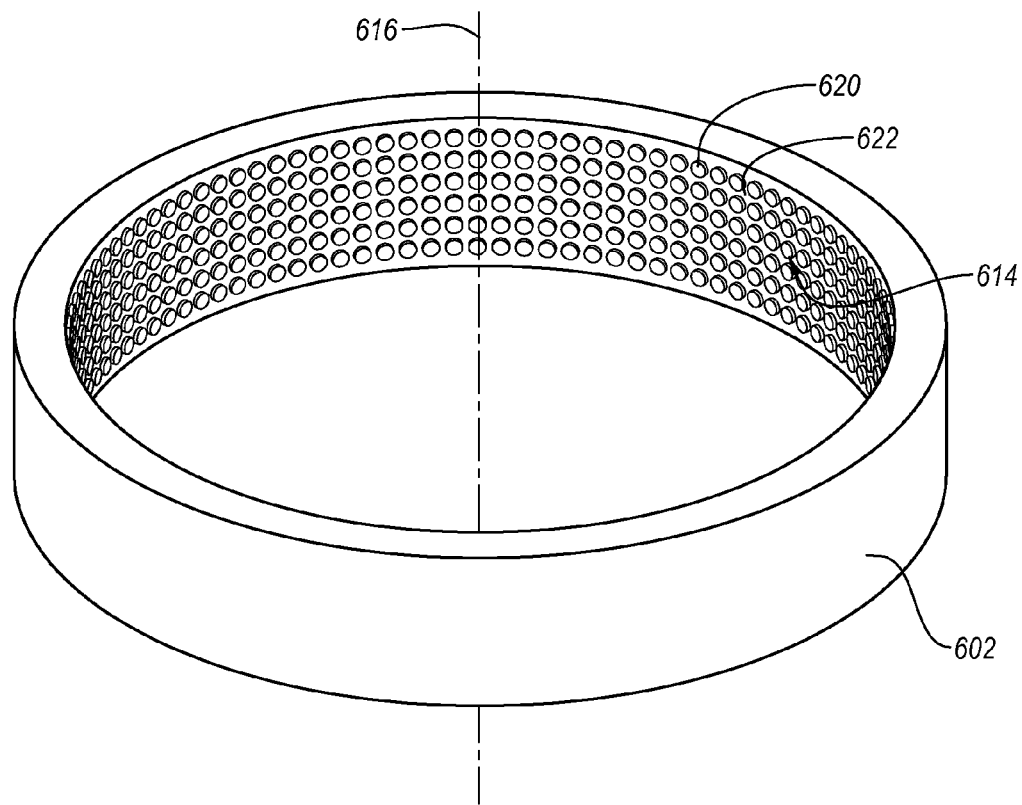

In other embodiments, the gaps 618 may be omitted. For example, the superhard bearing pads 608 may be positioned substantially adjacent one another such that the superhard bearing pads 608 form a quasi-continuous bearing surface 614 of discrete sub-superhard bearing elements 620 around the support ring 602. In yet other embodiments, the superhard bearing pads 608 may be omitted as illustrated in FIG. 6E. For example, the sub-superhard bearing elements 620 may be at least partially disposed in corresponding recesses (not shown) of the support ring 602 and secured partially therein via brazing, press-fitting, threadly, attaching, fastening with a fastener, combinations of the foregoing, or another suitable technique. Similar to the sub-superhard bearing elements 308a, the sub-superhard bearing elements 620 may have any suitable shape. As shown in FIG. 6E, the sub-superhard bearing elements 620 may be spaced from one another by one or more voids 622 and may be positioned and configured to form a quasi-continuous bearing surface 614 around the support ring 602.

Referring now to FIGS. 6C and 6D, at least some of the superhard bearing pads 608 may include the sub-superhard bearing elements 620. The sub-superhard bearing elements 620 may be arranged relative to each other to collectively define at least a portion of the bearing surface 614 of the respective superhard bearing pad 608. The sub-superhard bearing elements 620 may be formed in any suitable manner, and no particular method for forming the sub-superhard bearing elements 620 is to be considered limiting. In an embodiment, the sub-superhard bearing elements 620 may be spaced from one another by one or more voids 622. The sub-superhard bearing elements 620 may be configured similar to the sub-superhard bearing elements 120, 220 or any other sub-superhard bearing elements disclosed herein. Similarly, the voids 622 may be configured similar to the voids 122, 222, or any other void disclosed herein. For example, alone or in combination with the gaps 618, the voids 622 and/or the sub-superhard bearing elements 620 may be configured to assist with formation of a hydrodynamic film on the bearing surface 614 by limiting leakage of lubricating fluid between the sub-superhard bearing elements 620. In another embodiment, alone or in combination with the gaps 618, the voids 622 and/or the sub-superhard bearing elements 620 may be configured to influence heat removal by forming one or more radial and/or axial flow paths configured to allow lubricating fluid to flow through and/or between the sub-superhard bearing elements 620. Thus, by varying the configuration and size of the sub-superhard bearing elements 620 and/or the voids 622, the superhard bearing pads 608 may be configured to impart a desired amount of heat transfer and/or hydrodynamic fluid film formation during operation.

Figure 7A:
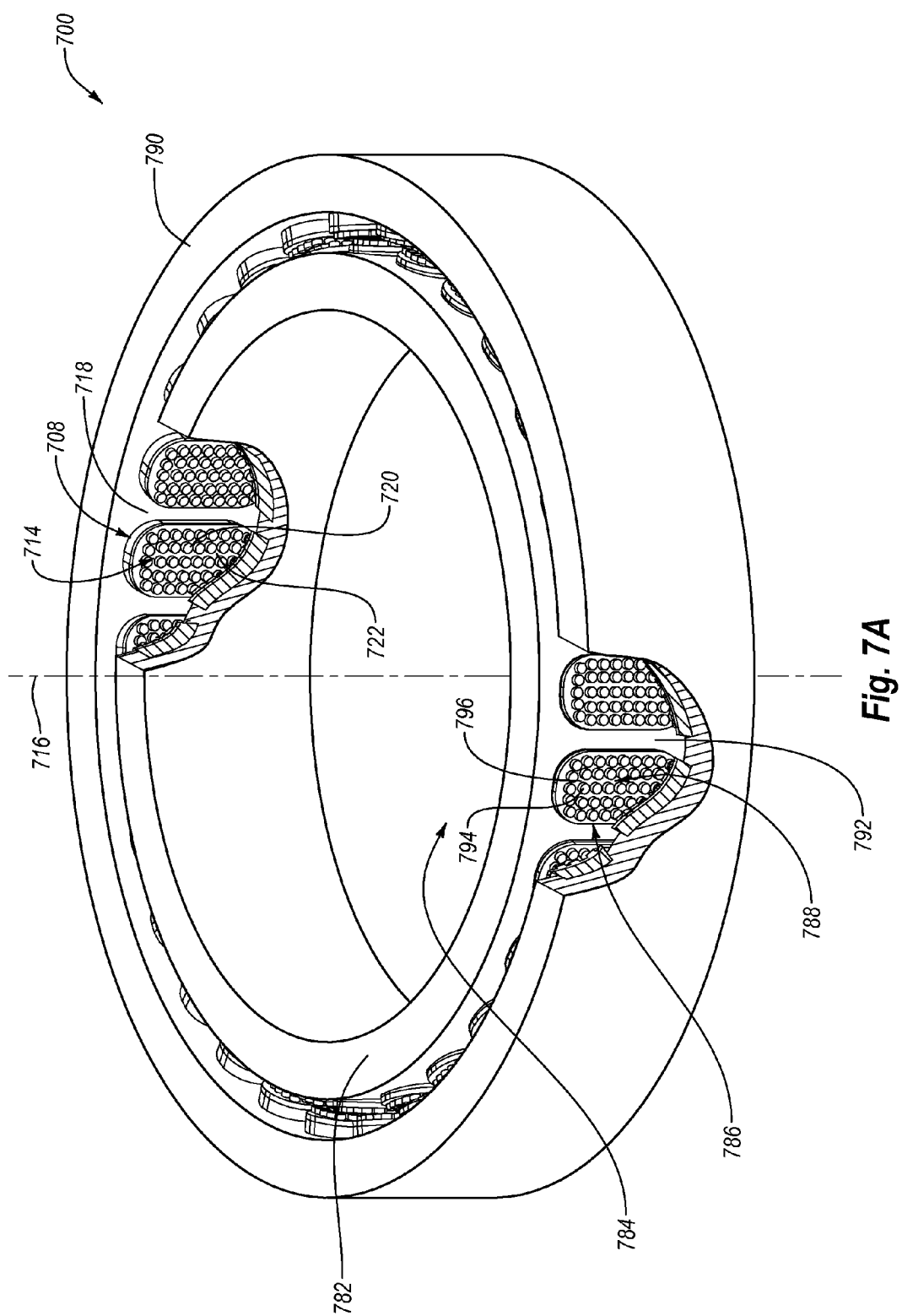
FIG. 7A is an isometric cutaway view of a radial bearing apparatus that may employ any of the disclosed radial bearing assemblies according to an embodiment.
Figure 7B:
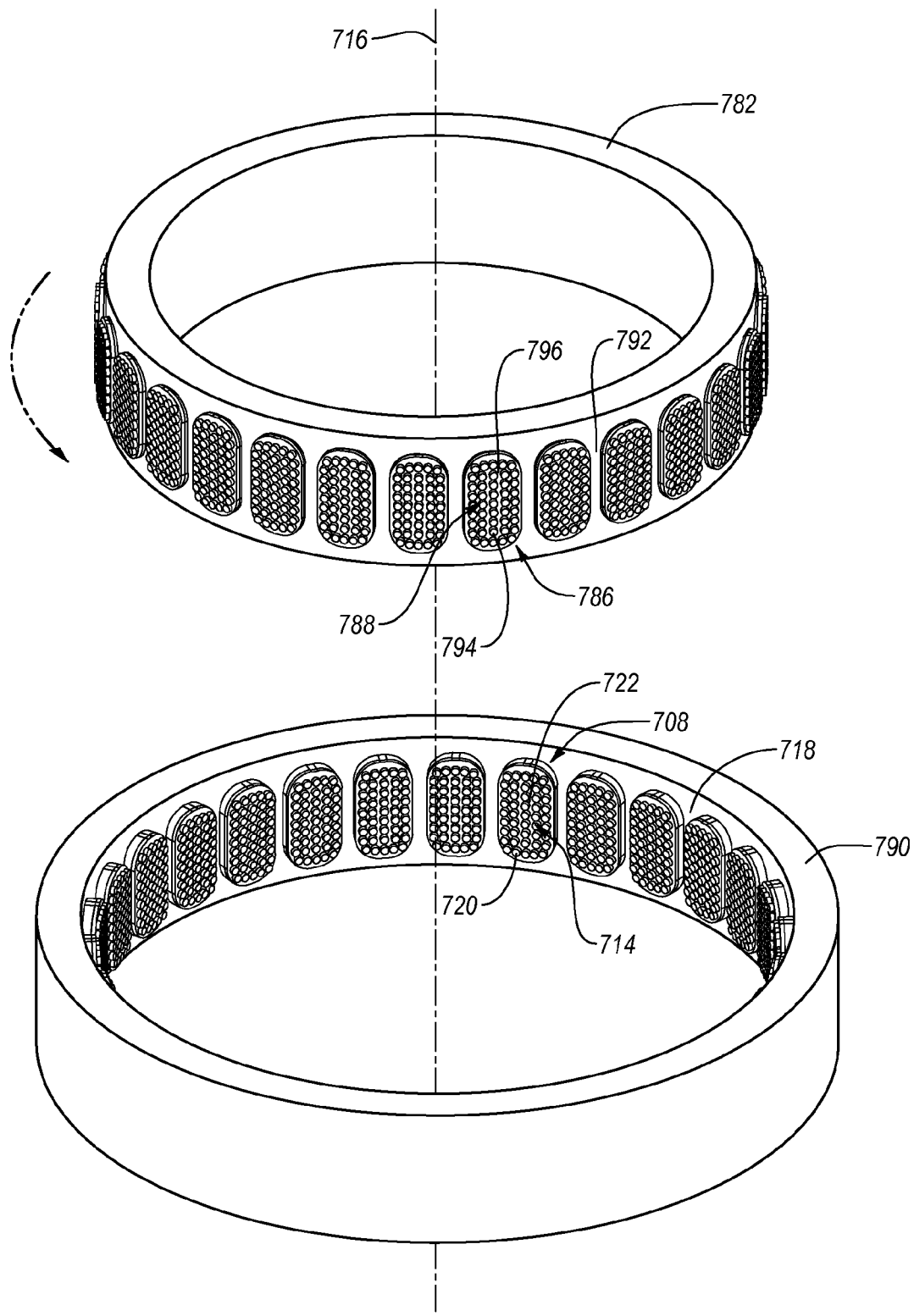
FIG. 7B is an exploded view of the radial bearing apparatus shown in FIG. 7A.

FIGS. 7A and 7B are isometric cutaway and exploded isometric, respectively, of a radial bearing apparatus 700 according to an embodiment. The radial bearing apparatus 700 may include an inner race 782 (i.e., a rotor). The inner race 782 may define an opening 784 and may include a plurality of circumferentially-adjacent superhard bearing pads 786 distributed about a rotation axis 716, each of which includes a convexly-curved bearing surface 788. As shown, gaps 792 or other offsets may be located between adjacent ones of the superhard bearing elements 786. The radial bearing apparatus 700 may further include an outer race 790 (i.e., a stator) that extends about and receives the inner race 782. The outer race 790 may include a plurality of circumferentially-adjacent superhard bearing pads 708 distributed about the rotation axis 716, each of which includes a concavely-curved bearing surface 714 to correspond to the convexly-curved bearing surfaces 788. The superhard bearing pads 708 and 786 may have a generally rounded rectangular shape and each may be made from any of the materials discussed above for the superhard bearing pads 108. As shown, gaps 718 or other offsets may be located between adjacent ones of the superhard bearing pads 708. In other embodiments, the superhard bearing pads 708 and 786 may have a generally elliptical shape, a generally non-cylindrical shape, or any other suitable shape. The terms "rotor" and "stator" refer to rotating and stationary components of the radial bearing apparatus 700, respectively. Thus, if the outer race 790 is configured to remain stationary, the outer race 790 may be referred to as the stator and the inner race 782 may be referred to as the rotor. A shaft or spindle (not shown) may extend through the opening 784 and may be secured to the rotor 782 by press-fitting the shaft or spindle to the rotor 782, threadly coupling the shaft or spindle to the rotor 782, or another suitable technique. A housing (not shown) may also be secured to the stator 790 using similar techniques.

In an embodiment, at least some of the superhard bearing pads 786 may include sub-superhard bearing elements 794. For example, the sub-superhard bearing elements 794 may be arranged relative to one other to collectively define at least a portion of the bearing surface 788 of each respective superhard bearing pad 786. The sub-superhard bearing elements 794 may be spaced from one another by one or more voids 796. The sub-superhard bearing elements 794 may be configured similar to the sub-superhard bearing elements 120, 620, or any other sub-superhard bearing elements disclosed herein. Likewise, the voids 796 may be configured similar to the voids 122, 622, or any other void disclosed herein. For example, in an embodiment, the voids 796 and/or the sub-superhard bearing elements 794 may be configured to assist with formation of a hydrodynamic film on the bearing surface 788 by limiting leakage of lubricating fluid between the sub-superhard bearing elements 794. In another embodiment, the voids 796 and/or the sub-superhard bearing elements 794 may be configured to influence heat removal by forming one or more flow paths configured to allow lubricating fluid to flow between the sub-superhard bearing elements 794. Optionally, similar to the gaps 118, the gaps 718 and 792 may be configured to assist with formation of a hydrodynamic film on the bearing surfaces.

The outer race 790 may also include a plurality of sub-superhard bearing elements 720. For example, at least some of the superhard bearing pads 708 of the outer race 790 may include sub-superhard bearing elements 720. The sub-superhard bearing elements 720 may be arranged relative to one another to collectively define at least a portion of the bearing surface 714 of the respective superhard bearing pad 708. The sub-superhard bearing elements 720 may be spaced from one another by one or more voids 722. The sub-superhard bearing elements 720 may be configured similar to the sub-superhard bearing elements 120, 720, or any other sub-superhard bearing elements disclosed herein. Likewise, the voids 722 may be configured similar to the voids 122, 622, or any other void disclosed herein. Generally, the outer race 790, the inner race 782, or both may include sub-superhard bearing elements.

The radial bearing apparatus 700 may be employed in a variety of mechanical applications. For example, so-called "rotary cone" rotary drill bits, pumps, transmissions or turbines may benefit from a radial bearing apparatus discussed herein. In operation, rotation of the shaft sections (not shown) secured to the rotor 782 may affect rotation of the rotor 782 relative to the stator 790. Lubricating fluid may be pumped through the radial bearing apparatus 700. Optionally, the sub-superhard bearing elements 720, 794 and/or the voids 722, 796 of the rotor 782 and/or stator 790 may help heat transfer from the superhard bearing pads 786 and 708. Moreover, under certain operational conditions and at sufficient rotational speeds for the rotor 782, a hydrodynamic fluid film may develop between the bearing surfaces 714 and bearing surfaces 788 to maintain the bearing surfaces apart from each other. Optionally, the sub-superhard bearing elements 720, 794 and/or the voids 722, 796 of the rotor 782 and/or stator 790 may help prevent lubricating fluid from leaking between adjacent superhard bearing pads 708, 786.

Figure 8:
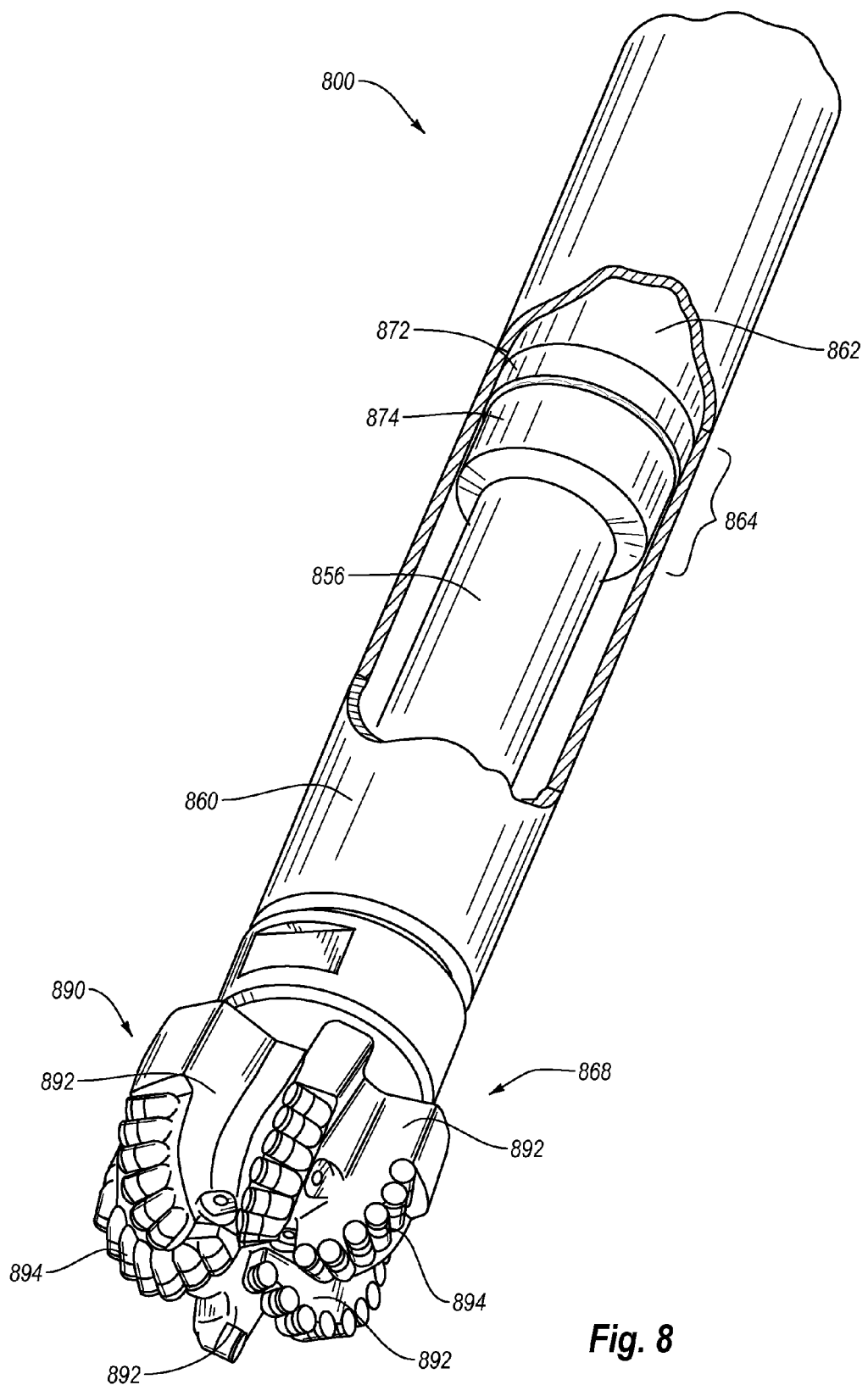
FIG. 8 is a schematic isometric cutaway view of a subterranean drilling system including a thrust-bearing apparatus utilizing any of the previously described bearing assemblies according to various embodiments.

Any of the embodiments for bearing apparatuses discussed above may be used in a subterranean drilling system. FIG. 8 is a schematic isometric cutaway view of a subterranean drilling system 800 according to an embodiment. The subterranean drilling system 800 may include a housing 860 enclosing a downhole drilling motor 862 (i.e., a motor, turbine, or any other device capable of rotating an output shaft) that may be operably connected to an output shaft 856. A thrust-bearing apparatus 864 may be operably coupled to the downhole drilling motor 862. The thrust-bearing apparatus 864 may be configured as any of the previously described thrust-bearing apparatus embodiments. A rotary drill bit 868 may be configured to engage a subterranean formation and drill a borehole and may be connected to the output shaft 856. The rotary drill bit 868 is shown comprising a bit body 890 that includes radially and longitudinally extending blades 892 with a plurality of PDCs 894 secured to the blades 892. However, other embodiments may utilize different types of rotary drill bits, such as core bits and/or roller-cone bits. As the borehole is drilled, pipe sections may be connected to the subterranean drilling system 800 to form a drill string capable of progressively drilling the borehole to a greater depth within the earth.

The thrust-bearing apparatus 864 may include a stator 872 that does not rotate and a rotor 874 that may be attached to the output shaft 856 and rotates with the output shaft 856. As discussed above, the thrust-bearing apparatus 864 may be configured as any of the embodiments disclosed herein. For example, the stator 872 may include a plurality of circumferentially-distributed superhard bearing pads (not shown) similar to those shown and described in the thrust-bearing assembly 100 of FIG. 1A. The rotor 874 may include a plurality of circumferentially-distributed superhard bearing pads (not shown) and sub-superhard bearing elements such as those shown and described in the thrust-bearing assembly 100 of FIG. 1A.

In operation, lubricating fluid may be circulated through the downhole drilling motor 862 to generate torque and rotate the output shaft 856 and the rotary drill bit 868 attached thereto so that a borehole may be drilled. A portion of the lubricating fluid may also be used to lubricate opposing bearing surfaces of the stator 872 and the rotor 874. Optionally, when the rotor 874 is rotated, the sub-superhard bearing elements of the rotor 874 may be configured to assist with formation of a hydrodynamic film between the opposing bearing surfaces by limiting leakage of lubricating fluid between adjacent sub-superhard bearing elements. Optionally, the sub-superhard bearing elements of the rotor 874 may also be configured to influence heat transfer by forming one or more flow paths through the sub-superhard bearing elements on the superhard bearing pads of the rotor 874. Optionally, gaps between the superhard bearing pads of the rotor 874 may also be configured to influence heat transfer and/or help develop a hydrodynamic fluid film between the superhard bearing pads of the rotor 874 and the stator 872.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
   a plurality of superhard bearing pads distributed circumferentially about an axis, at least some of the plurality of superhard bearing pads including:
   a plurality of sub-superhard bearing elements at least partially defining a bearing surface, at least some of the plurality of sub-superhard bearing elements spaced from one another by a plurality of voids to impart a selected amount of heat transfer and hydrodynamic film formation during operation, the plurality of voids exhibiting non-uniform widths that provide at least one non-uniform flow path therethrough; and
   a sintered carbide substrate supporting the plurality of sub-superhard bearing elements;
   wherein the plurality of voids extend from the bearing surface to the substrate; and
   a support ring that carries the plurality of superhard bearing pads, wherein at least a portion of the plurality of sub-superhard bearing elements extend beyond the support ring.

2. The bearing assembly of claim 1, wherein some of the plurality of sub-superhard bearing elements are positioned substantially equidistantly from adjacent ones of the plurality of sub-superhard bearing elements.

3. The bearing assembly of claim 1, wherein the plurality of sub-superhard bearing elements are staggered relative to one another, are positioned in one or more rows, or combinations thereof.

4. The bearing assembly of claim 1, wherein at least one of the plurality of sub-superhard bearing elements comprise a generally cylindrical body, a generally hexagonal body, an irregularly shaped body, or a generally rounded rectangular body.

5. The bearing assembly of claim 1, wherein a width of at least one of the plurality of voids is between about 0.0025 mm and about 2.5 mm.

6. The bearing assembly of claim 1, wherein a width of at least one of the plurality of voids is between about 0.005 mm and about 0.5 mm.

7. The bearing assembly of claim 1, wherein a width of at least one of the plurality of voids is about five (5) percent to about ninety (90) percent of a width of at least one of the plurality of sub-superhard bearing elements.

8. The bearing assembly of claim 1, wherein a width of at least one of the plurality of voids is about ten (10) percent to about eighty (80) percent of a width of at least one of the plurality of sub-superhard bearing elements.

9. The bearing assembly of claim 1, wherein a width of at least one of the plurality of voids is about five (5) percent to about fifty (50) percent of a height of at least one of the plurality of sub-superhard bearing elements.

10. The bearing assembly of claim 1, wherein the plurality of superhard bearing pads comprises a first plurality of superhard bearing pads, and wherein the plurality of voids between the plurality of sub-superhard bearing elements are positioned and configured to promote developing a fluid film between the first plurality of superhard bearing pads and a second plurality of superhard bearing pads carried by a second support ring, the second plurality of superhard bearing pads being generally opposed the first plurality of superhard bearing pads.

11. The bearing assembly of claim 1, wherein at least one of the plurality of superhard bearing pads comprises a grouping of generally cylindrical polycrystalline diamond compacts.

12. The bearing assembly of claim 1, wherein at least one of the plurality of superhard bearing pads comprise a non-cylindrical superhard bearing element.

13. A bearing apparatus, comprising:
a first bearing assembly including:
a first plurality of superhard bearing pads distributed circumferentially about an axis, at least some of the first plurality of superhard bearing pads including:
a first plurality of sub-superhard bearing elements at least partially defining a bearing surface, at least some of the first plurality of sub-superhard bearing elements spaced from one another by a plurality of voids to impart a selected amount of heat transfer and hydrodynamic film formation during operation, the plurality of voids exhibiting non-uniform widths that provide at least one non-uniform flow path therethrough; and
a sintered carbide substrate supporting the plurality of sub-superhard bearing elements;
wherein the plurality of voids extend from the bearing surface to the substrate; and
a first support ring that carries the first plurality of superhard bearing pads, wherein at least a portion of the first plurality of sub-superhard bearing elements extend beyond the first support ring;
a second bearing assembly including:
a second plurality of superhard bearing pads generally opposed to the first plurality of superhard bearing pads of the first bearing assembly;
a second support ring that carries the second plurality of superhard bearing pads; and
wherein the first bearing assembly is configured as a rotor or a stator and the second bearing assembly is configured as the other of the rotor or the stator.

14. The bearing apparatus of claim 13, wherein the first bearing assembly is configured as a rotor, and the second bearing assembly is configured as a stator.

15. The bearing apparatus of claim 13, wherein each of the second plurality of bearing pads comprises a second plurality of sub-superhard bearing elements.

16. The bearing apparatus of claim 13, wherein a first plurality of gaps are located between the first plurality of superhard bearing pads and a second plurality of gaps are located between the second plurality of superhard bearing pads.

17. The bearing apparatus of claim 16, wherein a width of at least one of the first plurality of gaps is greater than a width of at least one of the second plurality of gaps.

18. The bearing apparatus of claim 16, wherein the first plurality of gaps and the plurality of voids of the first plurality of sub-superhard bearing elements are configured to promote developing a fluid film between the first plurality of superhard bearing pads and the second plurality of superhard bearing pads.

19. A bearing apparatus, comprising:
a first bearing assembly including:
a first plurality of superhard bearing pads distributed circumferentially about an axis, at least some of the first plurality of superhard bearing pads including:
a first plurality of sub-superhard bearing elements at least partially defining a bearing surface, at least some of the first plurality of sub-superhard bearing elements spaced from one another by one or more voids to impart a selected amount of heat transfer and hydrodynamic film formation during operation, the plurality of voids exhibiting non-uniform widths that provide at least one non-uniform flow path therethrough; and
a substrate supporting the first plurality of sub-superhard bearing elements; and
a first support ring that carries the first plurality of superhard bearing pads, wherein at least a portion of the first plurality of sub-superhard bearing elements extend beyond the first support ring;
a second bearing assembly including:
a second plurality of superhard bearing pads generally opposed to the first plurality of superhard bearing pads of the first bearing assembly; and
a second support ring that carries the second plurality of superhard bearing pads,
wherein a first plurality of gaps are located between the first plurality of superhard bearing pads and a second plurality of gaps are located between the second plurality of superhard bearing pads, and wherein a width of at least one of the first plurality of gaps is greater than a width of at least one of the second plurality of gaps.

* * * * *